United States Patent
Saito

(10) Patent No.: US 9,181,483 B2
(45) Date of Patent: *Nov. 10, 2015

(54) LIQUID CRYSTAL COMPOSITION AND LIQUID CRYSTAL DISPLAY DEVICE

(71) Applicants: JNC CORPORATION, Tokyo (JP); JNC PETROCHEMICAL CORPORATION, Tokyo (JP)

(72) Inventor: Masayuki Saito, Chiba (JP)

(73) Assignees: JNC CORPORATION, Tokyo (JP); JNC PETROCHEMICAL CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,894

(22) Filed: Apr. 3, 2014

(65) Prior Publication Data

US 2014/0306158 A1    Oct. 16, 2014

(30) Foreign Application Priority Data

Apr. 15, 2013  (JP) ................. 2013-084623

(51) Int. Cl.
| | | |
|---|---|---|
| *G02F 1/1333* | (2006.01) | |
| *C09K 19/34* | (2006.01) | |
| *C09K 19/30* | (2006.01) | |
| *C09K 19/20* | (2006.01) | |
| C09K 19/04 | (2006.01) | |
| C09K 19/12 | (2006.01) | |

(52) U.S. Cl.
CPC ............. *C09K 19/3402* (2013.01); *C09K 19/20* (2013.01); *C09K 19/3066* (2013.01); *C09K 19/3068* (2013.01); C09K 2019/0444 (2013.01); C09K 2019/0466 (2013.01); C09K 2019/123 (2013.01); C09K 2019/3004 (2013.01); C09K 2019/3009 (2013.01); C09K 2019/3016 (2013.01); C09K 2019/3019 (2013.01); C09K 2019/3071 (2013.01); C09K 2019/3077 (2013.01); C09K 2019/3078 (2013.01); C09K 2019/3083 (2013.01); C09K 2019/3422 (2013.01)

(58) Field of Classification Search
CPC ............. G02F 1/1333; C09K 19/3402; C09K 19/3066; C09K 19/3068; C09K 19/20; C09K 2019/3422; C09K 2019/3071; C09K 2019/3077; C09K 2019/3078; C09K 2019/3083; C09K 2019/0444; C09K 2019/0466; C09K 2019/123; C09K 2019/3004; C09K 2019/3009; C09K 2019/3016; C09K 2019/3019
USPC ............... 252/299.01, 299.6, 299.61, 299.63; 349/182; 428/1.1
See application file for complete search history.

(56) References Cited

U.S. PATENT DOCUMENTS

| | | |
|---|---|---|
| 5,308,537 A | 5/1994 | Coates et al. |
| 2015/0069297 A1* | 3/2015 | Tanaka ..................... 252/299.61 |

FOREIGN PATENT DOCUMENTS

JP    H03-505742    12/1991

* cited by examiner

*Primary Examiner* — Geraldina Visconti

(74) *Attorney, Agent, or Firm* — Jianq Chyun IP Office

(57) ABSTRACT

To provide a liquid crystal composition satisfying at least one characteristic such as high maximum temperature of a nematic phase, low minimum temperature thereof, small viscosity, suitable optical anisotropy, large negative dielectric anisotropy, large specific resistance, high stability to ultraviolet light and heat, or has a suitable balance regarding at least two characteristics. To provide an AM device having short response time, a large voltage holding ratio, a large contrast ratio, long service life and so forth. A liquid crystal composition has a nematic phase and contains a specific compound having large dielectric anisotropy as a first component and a specific compound having small viscosity as a second component, and may contain a specific compound having high maximum temperature or small viscosity as a third component and a specific compound having large dielectric anisotropy as a fourth component, and a liquid crystal display device includes the composition.

15 Claims, No Drawings

LIQUID CRYSTAL COMPOSITION AND LIQUID CRYSTAL DISPLAY DEVICE

CROSS-REFERENCE TO RELATED APPLICATIONS

This application claims the priority benefit of Japan application serial no. 2013-084623, filed on Apr. 15, 2013. The entirety of the above-mentioned patent application is hereby incorporated by reference herein and made a part of this specification.

TECHNICAL FIELD

The invention relates to a liquid crystal composition, a liquid crystal display device including the composition, and so forth. In particular, the invention relates to a liquid crystal composition having a positive dielectric anisotropy, and an active matrix (AM) device including the composition and having a TN mode, an OCB mode, and IPS mode, an FFS mode or an FPA mode.

BACKGROUND ART

In a liquid crystal display device, a classification based on an operating mode for liquid crystal molecules includes a phase change (PC) mode, a twisted nematic (TN) mode, a super twisted nematic (STN) mode, an electrically controlled birefringence (ECB) mode, an optically compensated bend (OCB) mode, an in-plane switching (IPS) mode, a vertical alignment (VA) mode, a fringe field switching (FFS) mode and a field-induced photo-reactive alignment (FPA) mode. A classification based on a driving mode in the device includes a passive matrix (PM) and an active matrix (AM). The PM is classified into static, multiplex and so forth, and the AM is classified into a thin film transistor (TFT), a metal insulator metal (MIM) and so forth. The TFT is further classified into amorphous silicon and polycrystal silicon. The latter is classified into a high temperature type and a low temperature type according to a production process. A classification based on a light source includes a reflective type utilizing natural light, a transmissive type utilizing backlight and a transflective type utilizing both the natural light and the backlight.

The liquid crystal display device includes a liquid crystal composition having a nematic phase. The composition has suitable characteristics. An AM device having good characteristics can be obtained by improving the characteristics of the composition. Table 1 below summarizes a relationship of the characteristics between two aspects. The characteristics of the composition will be further explained based on a commercially available AM device. A temperature range of the nematic phase relates to a temperature range in which the device can be used. A preferred maximum temperature of the nematic phase is approximately 70° C. or higher and a preferred minimum temperature of the nematic phase is approximately −10° C. or lower. Viscosity of the composition relates to a response time in the device. A short response time is preferred for displaying moving images on the device. A shorter response time even by one millisecond is desirable. Accordingly, a small viscosity in the composition is preferred. A small viscosity at a low temperature is further preferred. An elastic constant of the composition relates to a contrast ratio in the device. In order to increase the contrast in the device, a large elastic constant in the composition is further preferred.

TABLE 1

Characteristics of Composition and AM Device

| No. | Characteristics of Composition | Characteristics of AM Device |
|---|---|---|
| 1 | Wide temperature range of a nematic phase | Wide usable temperature range |
| 2 | Small viscosity [1] | Short response time |
| 3 | Suitable optical anisotropy | Large contrast ratio |
| 4 | Large positive or negative dielectric anisotropy | Low threshold voltage and small electric power consumption Large contrast ratio |
| 5 | Large specific resistance | Large voltage holding ratio and large contrast ratio |
| 6 | High stability to ultraviolet light and heat | Long service life |
| 7 | Large elastic constant | Large contrast ratio and short response time |

[1] A liquid crystal composition can be injected into a liquid crystal cell in a shorter period of time.

An optical anisotropy of the composition relates to a contrast ratio in the device. In accordance with a mode of the device, a large optical anisotropy or a small optical anisotropy, more specifically, a suitable optical anisotropy is required. A product (Δn×d) of the optical anisotropy (Δn) of the composition and a cell gap (d) in the device is designed so as to maximize the contrast ratio. A suitable value of the product depends on a type of the operating mode. In a device having the TN mode or the like, a suitable value is approximately 0.45 micrometer. In the above case, a composition having a large optical anisotropy is preferred for a device having a small cell gap. A large dielectric anisotropy in the composition contributes to a low threshold voltage, a small electric power consumption and a large contrast ratio in the device. Accordingly, the large dielectric anisotropy is preferred. A large specific resistance in the composition contributes to a large voltage holding ratio and a large contrast ratio in the device. Accordingly, a composition having a large specific resistance at room temperature and also at a temperature close to the maximum temperature of the nematic phase in an initial stage is preferred. A composition having a large specific resistance at room temperature and also at a temperature close to the maximum temperature of the nematic phase even after the device has been used for a long period of time is preferred. Stability of the composition to ultraviolet light and heat relates to a service life of the liquid crystal display device. In the case where the stability is high, the device has a long service life. Such characteristics are preferred for an AM device for use in a liquid crystal projector, a liquid crystal television and so forth.

A composition having a positive dielectric anisotropy is used for an AM device having the TN mode. A composition having a negative dielectric anisotropy is used for an AM device having the VA mode. A composition having a positive or negative dielectric anisotropy is used for an AM device having the IPS mode or the FFS mode. A composition having a positive or negative dielectric anisotropy is used for an AM device having the polymer sustained alignment (PSA) mode. Examples of the liquid crystal composition having the positive dielectric anisotropy are disclosed in Patent literature No. 1 as described below.

REFERENCE LIST

Patent Literature

Patent literature No. 1: JP H3-505742 A.

SUMMARY OF INVENTION

The invention concerns a liquid crystal composition that has a nematic phase and contains at least one compound selected from the group of compounds represented by formula (1) as a first component and at least one compound selected from the group of a compounds represented by formula (2) as a second component, and a liquid crystal display device including the composition:

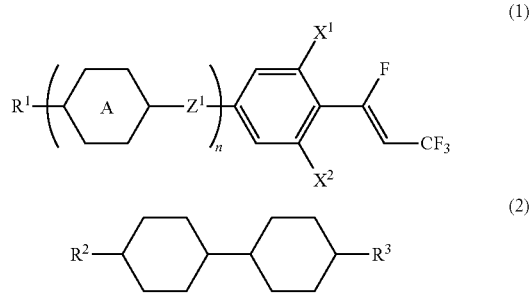

wherein, in formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons, or alkenyl having 2 to 12 carbons in which at least one of hydrogen is replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; $X^1$ and $X^2$ are independently hydrogen or fluorine; and n is 1, 2, 3 or 4.

The invention further concerns use of the liquid crystal composition in a liquid crystal display device.

DESCRIPTION OF EMBODIMENTS

One of the aims of the invention is to provide a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. Another aim is to provide a liquid crystal composition having a suitable balance between at least two of the characteristics. A further aim is to provide a liquid crystal display device including such a composition. An additional aim is to provide an AM device having a short response time, a large voltage holding ratio, a low threshold voltage, a large contrast ratio, a long service life and so forth.

An advantage of the invention is a liquid crystal composition satisfying at least one of characteristics such as a high maximum temperature of a nematic phase, a low minimum temperature of the nematic phase, a small viscosity, a suitable optical anisotropy, a large dielectric anisotropy, a large specific resistance, a high stability to ultraviolet light, a high stability to heat and a large elastic constant. Another advantage is a liquid crystal composition having a suitable balance between at least two of the characteristics. A further advantage is a liquid crystal display device including such a composition. An additional advantage is an AM device having a short response time, a large voltage holding ratio, a low threshold voltage, a large contrast ratio, a long service life and so forth.

Usage of terms herein is as described below. "Liquid crystal composition" or "liquid crystal display device" may be occasionally abbreviated as "composition" or "device," respectively. "Liquid crystal display device" is a generic term for a liquid crystal display panel and a liquid crystal display module. "Liquid crystal compound" is a generic term for a compound having a liquid crystal phase such as a nematic phase or a smectic phase, or a compound having no liquid crystal phase but being mixed with the composition for adjusting a temperature range of the nematic phase or characteristics such as viscosity and dielectric anisotropy. The compound has a six-membered ring such as 1,4-cyclohexylene and 1,4-phenylene, and a rod like molecular structure. "Polymerizable compound" is added for generating a polymer in the composition. At least one compound selected from the group of compounds represented by formula (1) may be occasionally abbreviated as "compound (1)." "Compound (1)" means one compound or two or more compounds represented by formula (1).

The liquid crystal composition is prepared by mixing a plurality of liquid crystal compounds. A ratio (content) of the liquid crystal compound is expressed in terms of weight percent (% by weight) based on the weight of the liquid crystal composition. An additive such as an optically active compound, an antioxidant, an ultraviolet light absorber, a dye, a defoaming agent, a polymerizable compound, a polymerization initiator and a polymerization inhibitor is added to the composition, when necessary. A ratio (content) of the additive is expressed in terms of weight percent (% by weight) based on the weight of the liquid crystal composition, in a manner similar to the ratio of the liquid crystal compound. The ratio of the additive may also be occasionally expressed in terms of parts per million (ppm). Ratios of the polymerization initiator and polymerization inhibitor are expressed exceptionally based on the weight of the polymerizable compound.

A higher limit of a temperature range of the nematic phase may be occasionally abbreviated as "maximum temperature." A lower limit of the temperature range of the nematic phase may be occasionally abbreviated as "minimum temperature." An expression "having a large specific resistance" means that the composition has a large specific resistance at room temperature and also at a temperature close to the maximum temperature of the nematic phase in an initial stage, and that the composition has a large specific resistance at room temperature and also at a temperature close to the maximum temperature of the nematic phase even after the device has been used for a long period of time. An expression "having a large voltage holding ratio" means that the device has a large voltage holding ratio at room temperature and also at a high temperature in an initial stage, and that the device has a large voltage holding ratio at room temperature and also at a temperature close to the maximum temperature of the nematic phase even after the device has been used for a long period of time.

An expression "at least one of 'A' may be replaced by 'B'" means that the number of 'A' is arbitrary. When the number of 'A' is one, a position of 'A' is arbitrary, and also when the number of 'A' is two or more, a position thereof can be selected without restriction. A same rule also applies to an expression "at least one of 'A' is replaced by 'B'."

A symbol of terminal group $R^1$ is used for a plurality of compounds in chemical formulas of component compounds. In the compounds, two groups represented by two of arbitrary $R^1$ may be identical or different. In one case, for example, $R^1$ of compound (1) is ethyl and $R^1$ of compound (1-1) is ethyl. In another case, $R^1$ of compound (1) is ethyl and $R^1$ of compound (1-1) is propyl. A same rule also applies to a symbol $R^2$, $X^7$, $Y^2$ or the like. When n is 2 in formula (1), two of ring A exist. In the compound, two rings represented by two of ring A may be identical or different. A same rule also applies to two of arbitrary ring A when n is larger than 2. A same rule also applies to a symbol $Z^1$, ring B or the like.

Further, 2-fluoro-1,4-phenylene means two divalent groups described below. In the chemical formulas, fluorine may be leftward (L) or rightward (R). A same rule also applies to an asymmetrical cyclic divalent group such as tetrahydropyran-2,5-diyl.

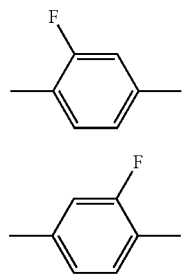

The invention includes the items described below.

Item 1. A liquid crystal composition that has a nematic phase and contains at least one compound selected from the group of compounds represented by formula (1) as a first component and at least one compound selected from the group of compounds represented by formula (2) as a second component:

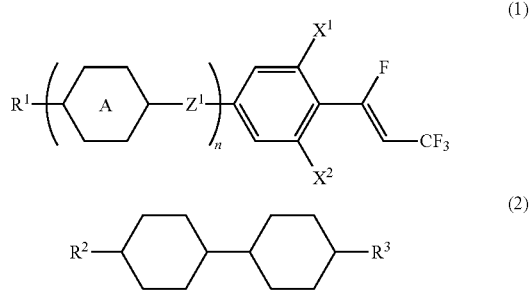

wherein, in formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons, or alkenyl having 2 to 12 carbons in which at least one of hydrogen is replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; $X^1$ and $X^2$ are independently hydrogen or fluorine; and n is 1, 2, 3 or 4.

Item 2. The liquid crystal composition according to item 1, containing at least one compound selected from the group of compounds represented by formula (1-1) to formula (1-14) as the first component:

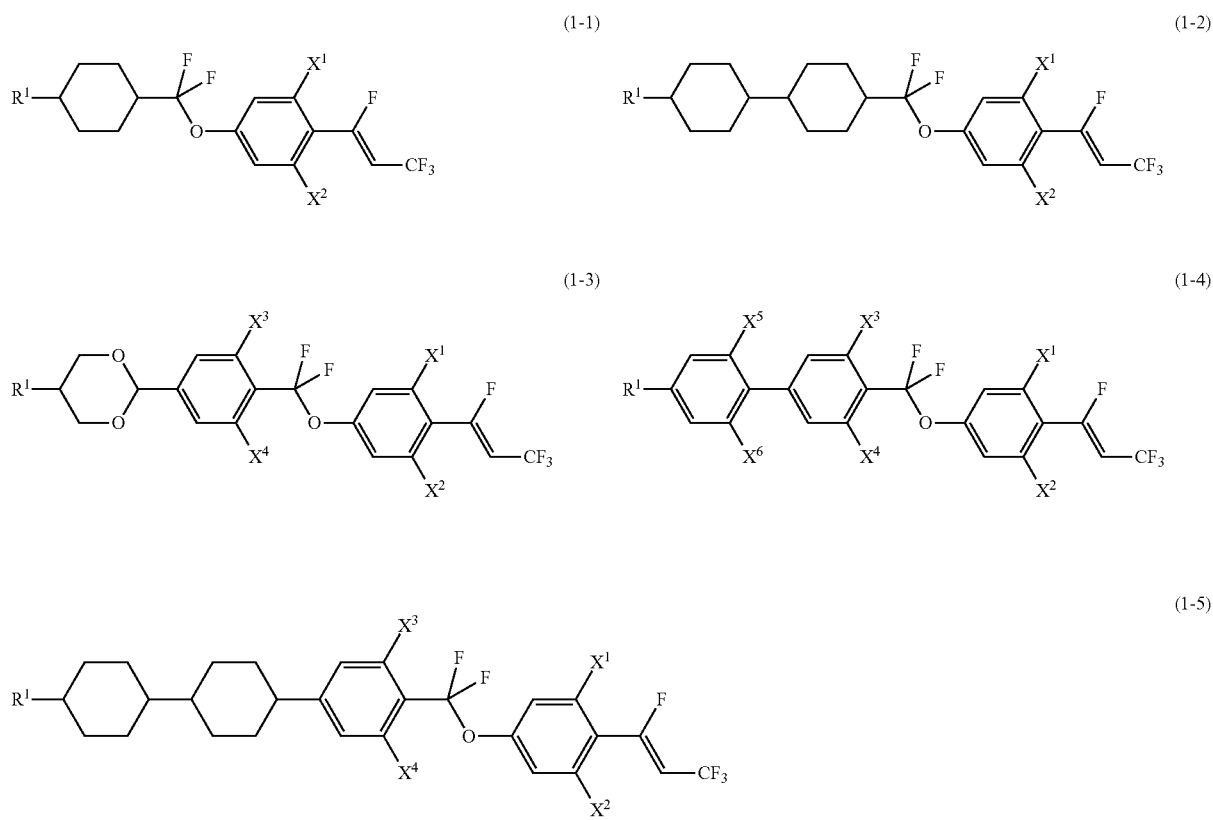

-continued
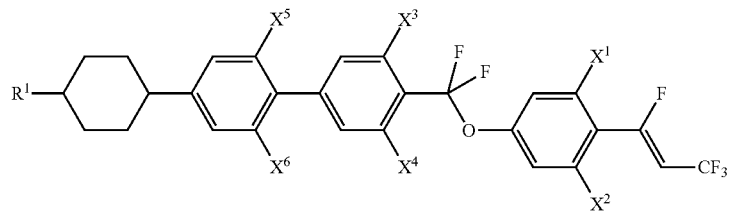
(1-6)
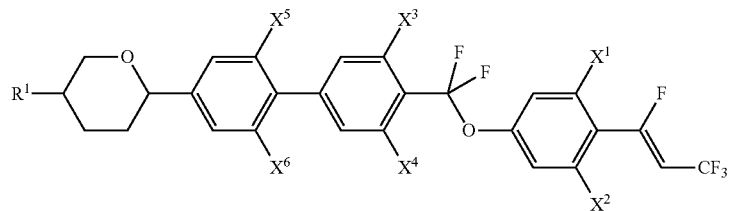
(1-7)
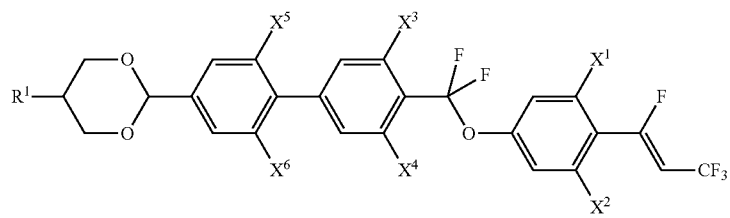
(1-8)
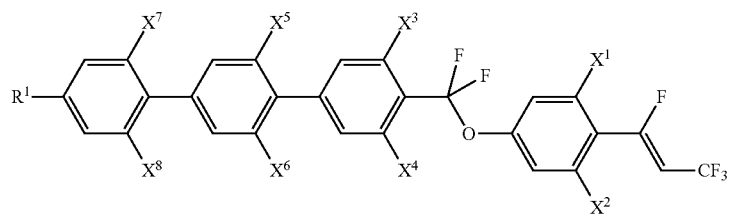
(1-9)
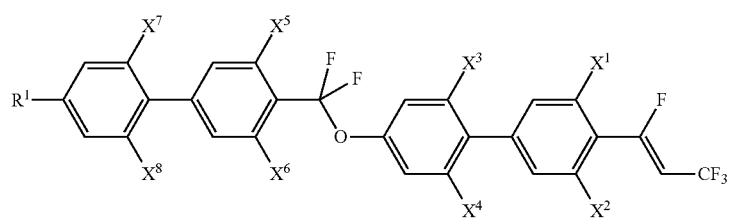
(1-10)
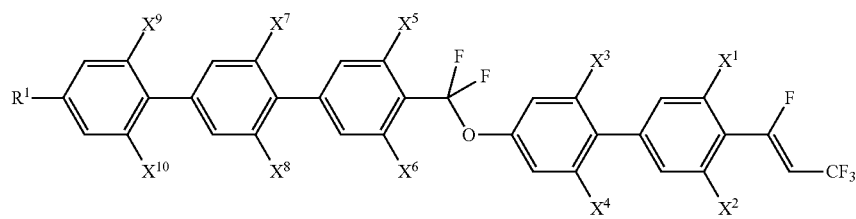
(1-11)
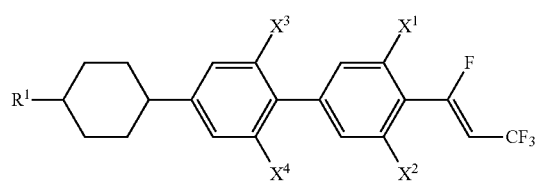
(1-12)
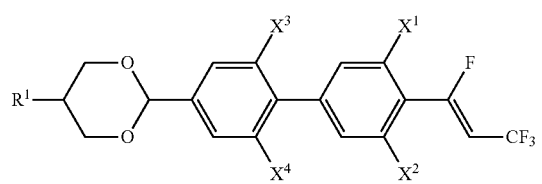
(1-13)

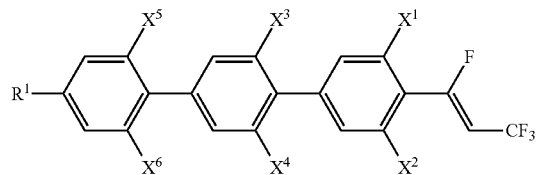
(1-14)

wherein, in formula (1-1) to formula (1-14), $R^1$ is alkyl having 1 to 12 carbons, alkoxy having 1 to 12 carbons or alkenyl having 2 to 12 carbons; and $X^1, X^2, X^3, X^4, X^5, X^6, X^7, X^8, X^9$ and $X^{10}$ are independently hydrogen or fluorine.

Item 3. The liquid crystal composition according to item 1 or 2, wherein a ratio of the first component is in the range of 5 to 30% by weight and a ratio of the second component is in the range of 15 by 60% by weight, based on the weight of the liquid crystal composition.

Item 4. The liquid crystal composition according to any one of items 1 to 3, further containing at least one compound selected from the group of compounds represented by formula (3) as a third component:

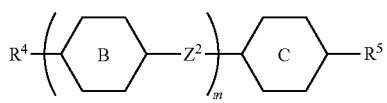
(3)

wherein, in formula (3), $R^4$ and $R^5$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; m is 1, 2 or 3; and however, when m is 1, ring C is 1,4-phenylene.

Item 5. The liquid crystal composition according to any one of items 1 to 4, containing at least one compound selected from the group of compounds represented by formula (3-1) to formula (3-12) as the third component:

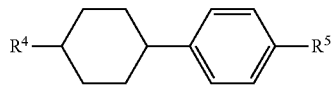
(3-1)

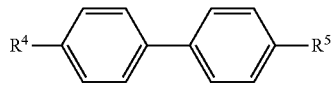
(3-2)

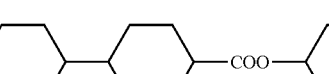
(3-3)

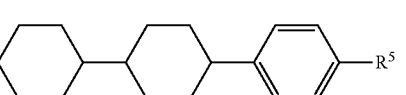
(3-4)

(3-5)

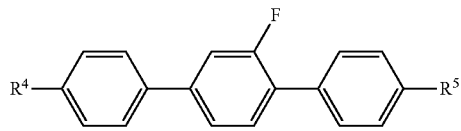
(3-6)

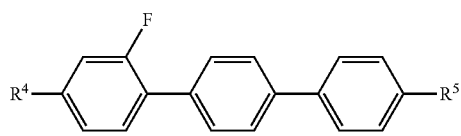
(3-7)

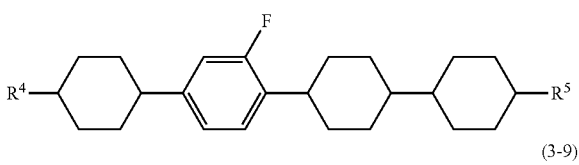
(3-8)

(3-9)

(3-10)

(3-11)

(3-12)

wherein, in formula (3-1) to formula (3-12), $R^4$ and $R^5$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

Item 6. The liquid crystal composition according to item 4 or 5, wherein a ratio of the third component is in the range of 5% by weight to 35% by weight based on the weight of the liquid crystal composition.

Item 7. The liquid crystal composition according to any one of items 1 to 6, further containing at least one compound selected from the group of compounds represented by formula (4) as a fourth component:

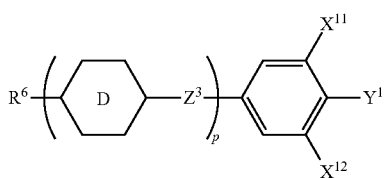

(4)

wherein, in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{11}$ and $X^{12}$ are independently hydrogen or fluorine; $Y^1$ is fluorine, chlorine, trifluoromethyl or trifluoromethoxy; and p is 1, 2, 3 or 4.

Item 8. The liquid crystal composition according to any one of items 1 to 7, containing at least one compound selected from the group of compounds represented by formula (4-1) to formula (4-27) as the fourth component:

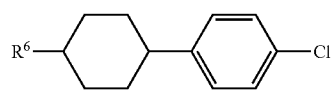
(4-1)

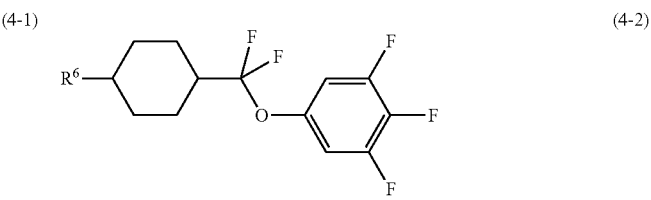
(4-2)

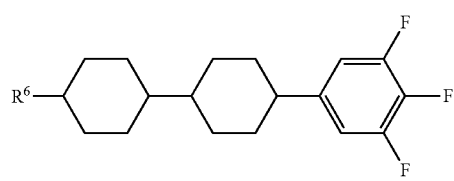
(4-3)

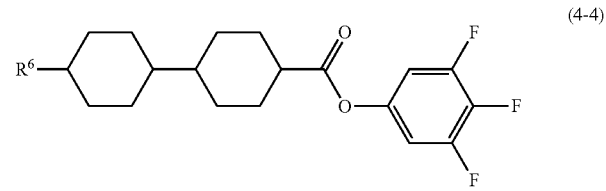
(4-4)

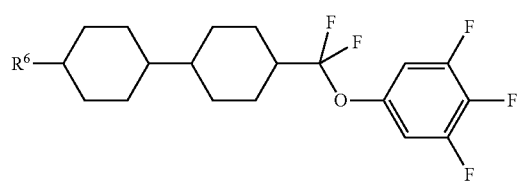
(4-5)

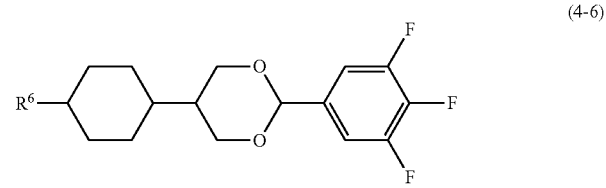
(4-6)

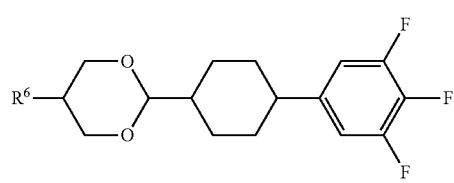
(4-7)

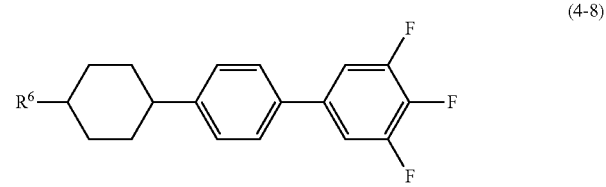
(4-8)

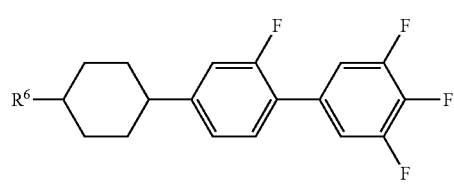
(4-9)

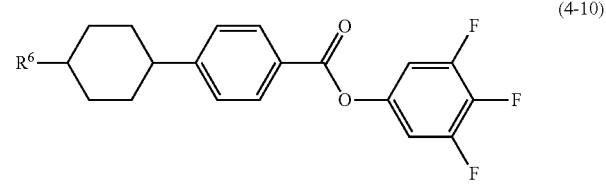
(4-10)

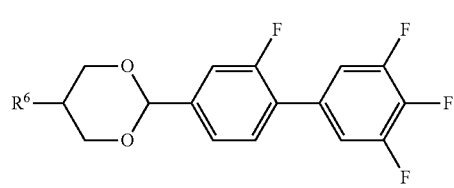
(4-11)

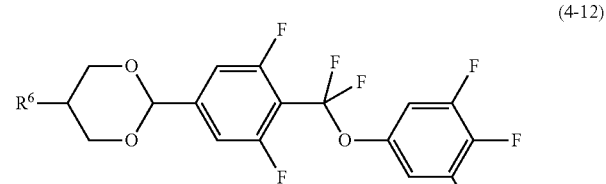
(4-12)

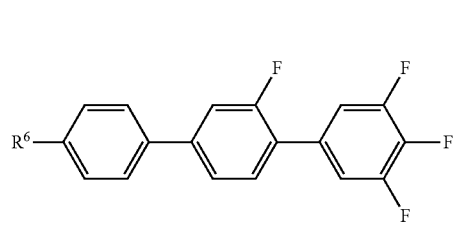
(4-13)

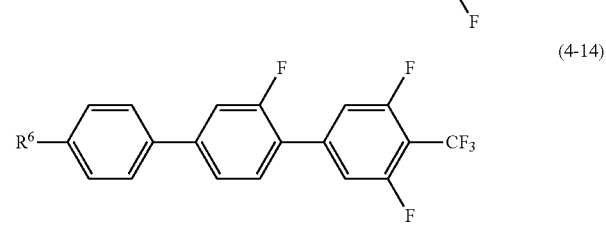
(4-14)

-continued
(4-15)
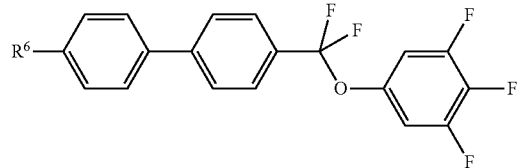
(4-16)
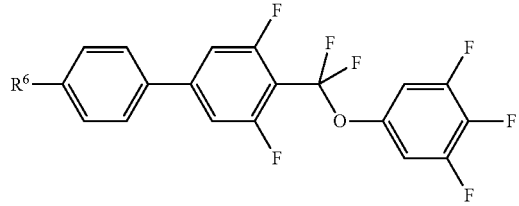
(4-17)
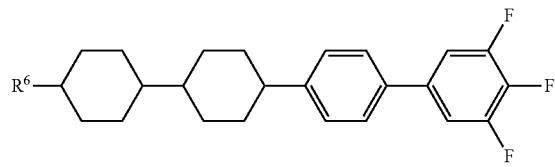
(4-18)
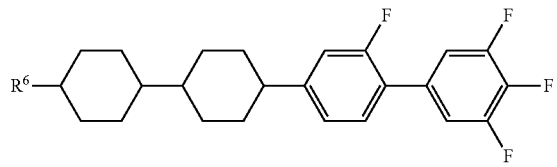
(4-19)
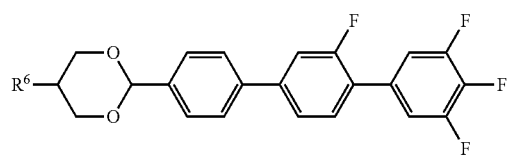
(4-20)
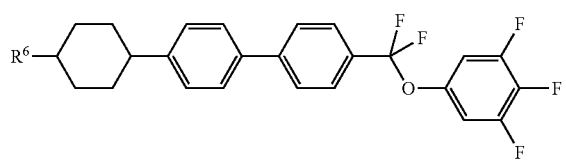
(4-21)
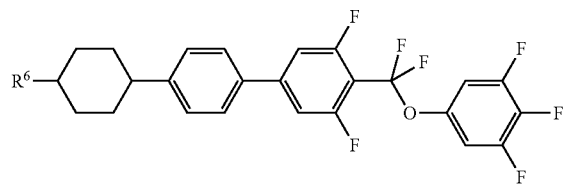
(4-22)
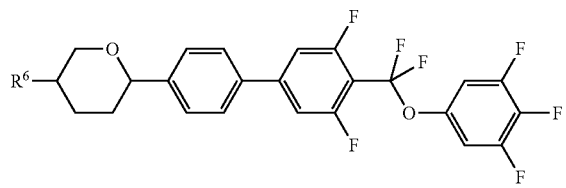
(4-23)
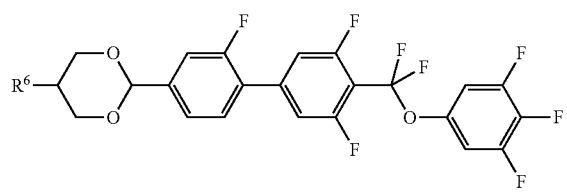
(4-24)
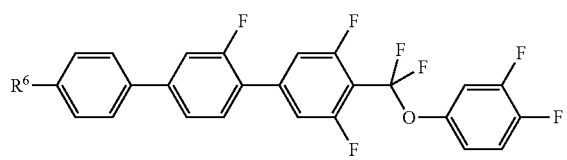
(4-25)
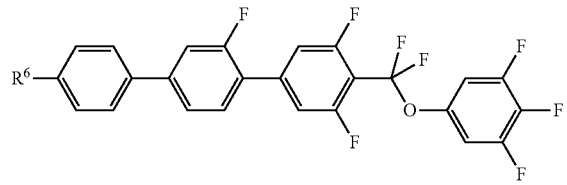
(4-26)
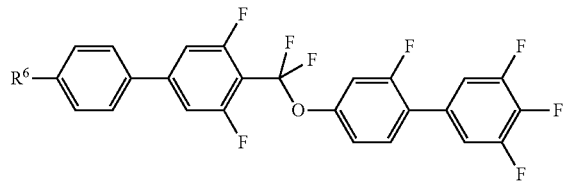
(4-27)
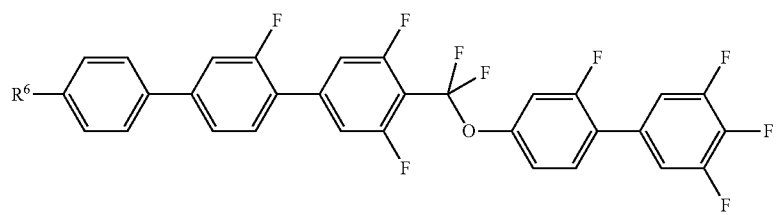

wherein, in formula (4-1) to formula (4-27), $R^6$ is alkyl having 1 to 12 carbons, alkoxy having 1 to 12 carbons or alkenyl having 2 to 12 carbons.

Item 9. The liquid crystal composition according to item 7 or 8, wherein, a ratio of the fourth component is in the range of 10% by weight to 60% by weight based on the weight of the liquid crystal composition.

Item 10. The liquid crystal composition according to any one of items 1 to 9, wherein a maximum temperature of a nematic phase is 70° C. or higher, optical anisotropy (measured at 25° C.) at a wavelength of 589 nanometers is 0.07 or more, and dielectric anisotropy (measured at 25° C.) at a frequency of 1 kHz is 2 or more.

Item 11. A liquid crystal display device including the liquid crystal composition according to any one of items 1 to 10.

Item 12. The liquid crystal display device according to item 11, wherein an operating mode in the liquid crystal display device is a TN mode, an ECB mode, an OCB mode, an IPS mode or an FPA mode, and a driving mode in the liquid crystal display device is an active matrix mode.

Item 13. Use of the liquid crystal composition according to any one of items 1 to 12 in a liquid crystal display device.

The invention further includes the following items: (a) the composition, further containing at least one of additives such as an optically active compound, an antioxidant, an ultraviolet light absorber, a dye, a defoaming agent, a polymerizable compound, a polymerization initiator and a polymerization inhibitor; (b) an AM device including the composition; (c) the composition, further containing a polymerizable compound, and an AM device having a polymer sustained alignment (PSA) mode, including the composition; (d) an AM device having a polymer sustained alignment (PSA) mode, including the composition in which the polymerizable compound in the composition is polymerized; (e) a device including the composition, and having a PC, TN, STN, ECB, OCB, IPS, VA, FFS or FPA mode; (f) a transmissive device including the composition; (g) use of the composition as a composition having the nematic phase; and (h) use of the composition as an optically active composition obtained by adding the optically active compound to the composition.

The composition of the invention will be explained in the following order. First, a constitution of the component compounds in the composition will be explained. Second, main characteristics of the component compounds and main effects of the compounds on the composition will be explained. Third, a combination of components in the composition, a preferred ratio of the component compounds and the basis thereof will be explained. Fourth, a preferred embodiment of the component compounds will be explained. Fifth, a preferred component compound will be shown. Sixth, an additive that may be added to the composition will be explained. Seventh, methods for synthesizing the component compounds will be explained. Last, an application of the composition will be explained.

First, the constitution of the component compounds in the composition will be explained. The composition of the invention is classified into composition A and composition B. Composition A may further contain any other liquid crystal compound, the additive or the like in addition to the liquid crystal compound selected from compound (1), compound (2), compound (3) and compound (4). "Any other liquid crystal compound" means a liquid crystal compound different from compound (1), compound (2), compound (3) and compound (4). Such a compound is mixed with the composition for the purpose of further adjusting the characteristics. The additive includes the optically active compound, the antioxidant, the ultraviolet light absorber, the dye, the antifoaming agent, the polymerizable compound, the polymerization initiator and the polymerization inhibitor.

Composition B consists essentially of a liquid crystal compound selected from the group of compound (1), compound (2), compound (3) and compound (4). A term "essentially" means that the composition may contain the additive, but does not contain any other liquid crystal compound. Composition B has a smaller number of components than composition A has. Composition B is preferred to composition A in view of cost reduction. Composition A is preferred to composition B in view of capability of further adjusting characteristics by mixing any other liquid crystal compound.

Second, the main characteristics of the component compounds and the main effects of the compounds on the characteristics of the composition will be explained. The main characteristics of the component compounds are summarized in Table 2 on the basis of advantageous effects of the invention. In Table 2, a symbol L stands for "large" or "high," a symbol M stands for "medium," and a symbol S stands for "small" or "low." The symbols L, M and S represent a classification based on a qualitative comparison among the component compounds, and 0 (zero) means "a value is nearly zero."

TABLE 2

| Characteristics of compound | | | | |
|---|---|---|---|---|
| Compound | (1) | (2) | (3) | (4) |
| Maximum temperature | S to L | M | S to L | S to L |
| Viscosity | M to L | S | S to M | M to L |
| Optical anisotropy | M to L | S | M to L | M to L |
| Dielectric anisotropy | L | 0 | 0 | S to L |
| Specific resistance | L | L | L | L |

Upon mixing the component compounds with the composition, the main effects of the component compounds on the characteristics of the composition are as described below. Compound (1) increases the dielectric anisotropy. Compound (2) decreases the viscosity. Compound (3) increases the maximum temperature or decreases the minimum temperature. Compound (4) decreases the minimum temperature and increases the dielectric anisotropy.

Third, the combination of the components in the composition, the preferred ratio of the component compounds and the basis thereof will be explained. The combination of components in the composition includes a combination of the first component and the second component, a combination of the first component, the second component and the third component, a combination of the first component, the second component and the fourth component and a combination of the first component, the second component, the third component and the fourth component. A preferred combination of the components in the composition includes the combination of the first component, the second component and the third component, and the combination of the first component, the second component, the third component and the fourth component.

A preferred ratio of the first component is approximately 5% by weight or more for increasing the dielectric anisotropy, and approximately 30% by weight or less for decreasing the minimum temperature or decreasing the viscosity. A further preferred ratio is in the range of approximately 5% by weight to approximately 25% by weight. A particularly preferred ratio is in the range of approximately 5% by weight to approximately 20% by weight.

A preferred ratio of the second component is approximately 15% by weight or more for decreasing the viscosity, and approximately 60% or less for increasing the dielectric anisotropy. A further preferred ratio is in the range of approximately 20% by weight to approximately 55% by weight. A particularly preferred ratio is in the range of approximately 25% by weight to approximately 50% by weight.

A preferred ratio of the third component is approximately 5% by weight or more for increasing the maximum temperature or decreasing the viscosity, and approximately 35% by weight or less for increasing the dielectric anisotropy. A further preferred ratio is in the range of approximately 5% by weight to approximately 30% by weight. A particularly preferred ratio is in the range of approximately 5% by weight to approximately 25% by weight.

A preferred ratio of the fourth component is approximately 10% by weight or more for increasing the dielectric anisotropy, and approximately 60% by weight or less for decreasing the minimum temperature. A further preferred ratio is in the range of approximately 15% by weight to approximately 50% by weight. A particularly preferred ratio is in the range of approximately 20% by weight to approximately 45% by weight.

Fourth, the preferred embodiment of the component compounds will be explained. $R^1$, $R^2$ and $R^6$ are independently alkyl having 1 to 12 carbons, alkoxy having 1 to 12 carbons or alkenyl having 2 to 12 carbons. Preferred $R^1$, $R^2$ or $R^6$ is alkyl having 1 to 12 carbons for increasing the stability to ultraviolet light or heat. $R^3$ is alkenyl having 2 to 12 carbons, or alkenyl having 2 to 12 carbons in which at least one of hydrogen is replaced by fluorine. $R^4$ and $R^5$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine. Preferred $R^4$ or $R^5$ is alkyl having 1 to 12 carbons for increasing the stability or the like to ultraviolet light or heat, and alkenyl having 2 to 12 carbons for decreasing the minimum temperature or decreasing the viscosity.

Preferred alkyl is methyl, ethyl, propyl, butyl, pentyl, hexyl, heptyl or octyl. Further preferred alkyl is ethyl, propyl, butyl, pentyl or heptyl for decreasing the viscosity.

Preferred alkoxy is methoxy, ethoxy, propoxy, butoxy, pentyloxy, hexyloxy or heptyloxy. Further preferred alkoxy is methoxy or ethoxy for decreasing the viscosity.

Preferred alkenyl is vinyl, 1-propenyl, 2-propenyl, 1-butenyl, 2-butenyl, 3-butenyl, 1-pentenyl, 2-pentenyl, 3-pentenyl, 4-pentenyl, 1-hexenyl, 2-hexenyl, 3-hexenyl, 4-hexenyl or 5-hexenyl. Further preferred alkenyl is vinyl, 1-propenyl, 3-butenyl or 3-pentenyl for decreasing the viscosity. A preferred configuration of —CH═CH— in the alkenyl depends on a position of a double bond. Trans is preferred in the alkenyl such as 1-propenyl, 1-butenyl, 1-pentenyl, 1-hexenyl, 3-pentenyl and 3-hexenyl for decreasing the viscosity, for instance. C is preferred in the alkenyl such as 2-butenyl, 2-pentenyl and 2-hexenyl. In the alkenyl, straight-chain alkenyl is preferred than branched-chain alkenyl.

Preferred examples of alkenyl in which at least one of hydrogen is replaced by fluorine include 2,2-difluorovinyl, 3,3-difluoro-2-propenyl, 4,4-difluoro-3-butenyl, 5,5-difluoro-4-pentenyl or 6,6-difluoro-5-hexenyl. Further preferred examples include 2,2-difluorovinyl or 4,4-difluoro-3-butenyl for decreasing the viscosity.

Then, n is 1, 2, 3 or 4. Preferred n is 2 for decreasing the minimum temperature. Further, m is 1, 2 or 3. Preferred m is 2 for increasing the maximum temperature. Then, p is 1, 2, 3 or 4. Preferred p is 2 for decreasing the minimum temperature.

$Z^1$ is a single bond, ethylene, vinylene, methyleneoxy, carbonyloxy or difluoromethyleneoxy. Preferred $Z^1$ is difluoromethyleneoxy for increasing the dielectric anisotropy. $Z^2$ is a single bond, ethylene or carbonyloxy. Preferred $Z^2$ is a single bond for decreasing the viscosity. $Z^3$ is a single bond, ethylene, carbonyloxy or difluoromethyleneoxy. Preferred $Z^3$ is difluoromethyleneoxy for increasing the dielectric anisotropy.

Ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl. Preferred ring A is 1,4-phenylene or 2-fluoro-1,4-phenylene for increasing the optical anisotropy. Ring B and ring C are independently 1,4-cyclohexylene, 1,4-phenylene, 2-fluoro-1,4-phenylene or 2,5-difluoro-1,4-phenylene. Preferred ring B or ring C is 1,4-cyclohexylene for decreasing the viscosity, and 1,4-phenylene for increasing the optical anisotropy. Ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl. Preferred ring D is 1,4-phenylene or 2-fluoro-1,4-phenylene for increasing the optical anisotropy. With regard to a configuration of 1,4-cyclohexylene, trans is preferred to cis for increasing the maximum temperature. Tetrahydropyran-2,5-diyl includes:

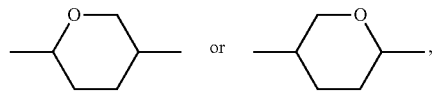

and preferably

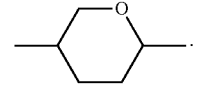

.

$X^1$, $X^2$, $X^3$, $X^4$, $X^5$, $X^6$, $X^7$, $X^8$, $X^9$, $X^{10}$, $X^{11}$ and $X^{12}$ are independently hydrogen or fluorine. Preferred $X^1$, $X^2$, $X^3$, $X^4$, $X^5$, $X^6$, $X^7$, $X^8$, $X^9$, $X^{10}$, $X^{11}$ or $X^{12}$ is fluorine for increasing the dielectric anisotropy.

$Y^1$ is fluorine, chlorine, trifluoromethyl or trifluoromethoxy. Preferred $Y^1$ is fluorine for decreasing the minimum temperature.

Fifth, the preferred component compounds will be shown. Preferred compound (1) includes compound (1-1) to compound (1-14). In the compounds, at least one of the first components preferably includes compound (1-3), compound (1-4), compound (1-5), compound (1-6), compound (1-8), compound (1-9), compound (1-13) or compound (1-14). At least two of the first components preferably include a combination of compound (1-3) and compound (1-8), compound (1-4) and compound (1-6), compound (1-4) and compound (1-9), or compound (1-13) and compound (1-14).

Preferred compound (3) includes compound (3-1) to compound (3-12). In the compounds, at least one of the third components preferably includes compound (3-2), compound (3-4), compound (3-5), compound (3-6), compound (3-9) or compound (3-12). At least two of the third components preferably include a combination of compound (3-2) and compound (3-4), compound (3-2) and compound (3-5), or compound (3-2) and compound (3-6).

Preferred compound (4) includes compound (4-1) to compound (4-27). In the compounds, at least one of the fourth components preferably includes compound (4-5), compound (4-11), compound (4-12), compound (4-13), compound (4-15), compound (4-16), compound (4-20), compound (4-23) or compound (4-25). At least two of the fourth components preferably include a combination of compound (4-12) and compound (4-23), compound (4-13) and compound (4-16), compound (4-15) and compound (4-16), compound (4-16) and compound (4-25), or compound (4-23) and compound (4-25).

Sixth, the additive that may be added to the composition will be explained. Such an additive includes the optically active compound, the antioxidant, the ultraviolet light absorber, the dye, the antifoaming agent, the polymerizable compound, the polymerization initiator and the polymerization inhibitor. The optically active compound is added to the composition for the purpose of inducing a helical structure in liquid crystals to give a twist angle. Examples of such a compound include compound (5-1) to compound (5-5). A preferred ratio of the optically active compound is approximately 5% by weight or less. A further preferred ratio is in the range of approximately 0.01% by weight to approximately 2% by weight.

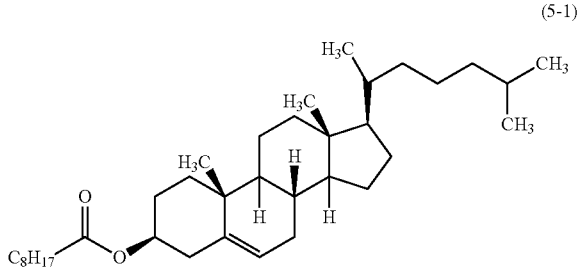

(5-1)

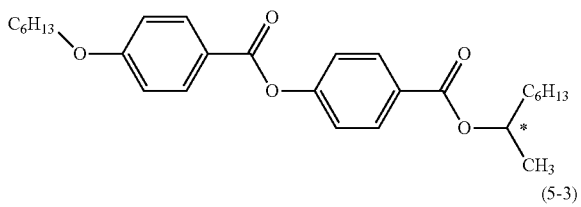

(5-2)

(5-3)

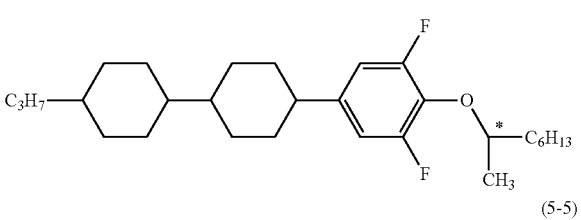

(5-4)

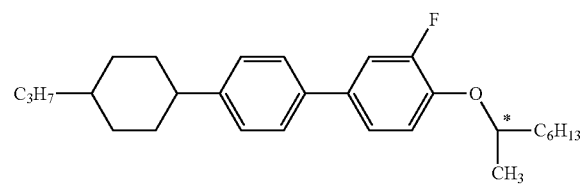

(5-5)

The antioxidant is added to the composition for the purpose of preventing a decrease in the specific resistance caused by heating in air, or maintaining a large voltage holding ratio at room temperature and also at a temperature close to the maximum temperature even after the device has been used for a long period of time. Preferred examples of the antioxidant include compound (6) where t is an integer from 1 to 9.

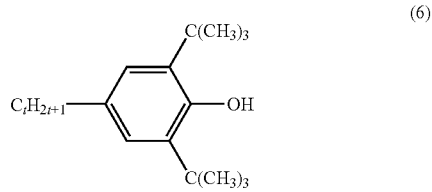

(6)

In compound (6), preferred t is 1, 3, 5, 7 or 9. Further preferred t is 7. Compound (6) where t is 7 is effective in maintaining a large voltage holding ratio at room temperature and also at a temperature close to the maximum temperature even after the device has been used for a long period of time because the compound (6) has a small volatility. A preferred ratio of the antioxidant is approximately 50 ppm or more for achieving the effect thereof, and approximately 600 ppm or less for avoiding a decrease in the maximum temperature or avoiding an increase in the minimum temperature. A further preferred ratio is in the range of approximately 100 ppm to approximately 300 ppm.

Preferred examples of the ultraviolet light absorber include a benzophenone derivative, a benzoate derivative and a triazole derivative. A light stabilizer such as an amine having steric hindrance is also preferred. A preferred ratio of the ultraviolet light absorber or the stabilizer is approximately 50 ppm or more for achieving the effect thereof, and approximately 10,000 ppm or less for avoiding a decrease in the maximum temperature or avoiding an increase in the minimum temperature. A further preferred ratio is in the range of approximately 100 ppm to approximately 10,000 ppm.

A dichroic dye such as an azo dye or an anthraquinone dye is added to the composition to be adapted for a device having a guest host (GH) mode. A preferred ratio of the dye is in the range of approximately 0.01% by weight to approximately 10% by weight. The antifoaming agent such as dimethyl silicone oil or methyl phenyl silicone oil is added to the composition for preventing foam formation. A preferred ratio of the antifoaming agent is approximately 1 ppm or more for achieving the effect thereof, and approximately 1,000 ppm or less for avoiding a poor display. A further preferred ratio is in the range of approximately 1 ppm to approximately 500 ppm.

The polymerizable compound is added to the composition to be adapted for the device having the polymer sustained alignment (PSA) mode. Preferred examples of the polymerizable compound include a compound having a polymerizable group, such as an acrylate, a methacrylate, a vinyl compound, a vinyloxy compound, a propenyl ether, an epoxy compound (oxirane, oxetane) and a vinyl ketone. Further preferred examples include an acrylate derivative or a methacrylate derivative. A preferred ratio of the polymerizable compound is approximately 0.05% by weight or more for achieving the effect thereof, and approximately 10% by weight or less for avoiding a poor display. A further preferred ratio is in the range of approximately 0.1% by weight to approximately 2% by weight. The polymerizable compound polymerizes by irradiation with ultraviolet light. The compound may be polymerized in the presence of an initiator such as a photopolymerization initiator. Suitable conditions for polymerization, suitable types of the initiator and suitable amounts thereof are known to those skilled in the art and are described in literatures. For example, Irgacure 651 (registered trademark; BASF), Irgacure 184 (registered trademark; BASF) or Darocure 1173 (registered trademark; BASF), each being a photoinitiator, is suitable for radical polymerization. A preferred ratio of the photopolymerization initiator is in the range of approximately 0.1% by weight to approximately 5% by weight based on the weight of the polymerizable compound. A further preferred ratio is in the range of approximately 1% by weight to approximately 3% by weight.

Upon storing the polymerizable compound, the polymerization inhibitor may be added to prevent polymerization. The polymerizable compound is added to the composition ordinarily without removing the polymerization inhibitor. Examples of the polymerization inhibitor include a hydroquinone derivative such as hydroquinone and methylhydroquinone, 4-tert-butylcatechol, 4-methoxy phenol and phenothiazine.

Seventh, the methods for synthesizing the component compounds will be explained. The compounds can be prepared according to known methods. Examples of synthetic methods will be shown. A terminal group of compound (1) includes —CF═CH—CF$_3$. The group is formed in accordance with the method of A. K. Ghosh and B. Zajc, J. Org. Chem., 74, 8531 (2009). First, a synthetic intermediate of compound (1) is converted into 1-phenyl-1H-tetrazole-5-yl sulfone. Next, an alpha-position of the sulfone is fluorinated, and then allowing the resulting fluorinated product to react with trifluoroacetaldehyde to give an object. Compound (2) is prepared by the method described in JP S59-176221 A. Compound (3-12) is prepared by the method described in JP H2-237949 A. Compound (4-3) and compound (4-8) are prepared by the method described in JP H2-233626 A. The antioxidant is commercially available. A compound represented by formula (6) where t is 1 is available from Sigma-Aldrich Corporation. Compound (6) where t is 7 and so forth are prepared according to the method described in U.S. Pat. No. 3,660,505 B.

Any compounds whose synthetic methods are not described above can be prepared according to the methods described in books such as Organic Syntheses (John Wiley & Sons, Inc.), Organic Reactions (John Wiley & Sons, Inc.), Comprehensive Organic Synthesis (Pergamon Press) and New Experimental Chemistry Course (Shin Jikken Kagaku Koza in Japanese) (Maruzen Co., Ltd.). The composition is prepared according to publicly known methods using the thus obtained compounds. For example, the component compounds are mixed and dissolved in each other by heating.

Last, the application of the composition will be explained. The composition of the invention mainly has a minimum temperature of approximately −10° C. or lower, a maximum temperature of approximately 70° C. or higher, and an optical anisotropy in the range of approximately 0.07 to approximately 0.20. The device including the composition has a large voltage holding ratio. The composition is suitable for use in the AM device. The composition is particularly suitable for use in a transmissive AM device. The composition having an optical anisotropy in the range of approximately 0.08 to approximately 0.25, and also the composition having an optical anisotropy in the range of approximately 0.10 to approximately 0.30 may be prepared by controlling the ratio of the component compounds or by mixing with any other liquid crystal compound. The composition can be used as the composition having the nematic phase and as the optically active composition by adding the optically active compound.

The composition can be used for the AM device. The composition can also be used for a PM device. The composition can be used for an AM device and a PM device both having a mode such as PC, TN, STN, ECB, OCB, IPS, FFS, VA or FPA. Use for the AM device having the TN, OCB, IPS or FFS mode is particularly preferred. In the AM device having the IPS mode or FFS mode, alignment of liquid crystal molecules in a state in which no voltage is applied may be parallel or perpendicular to a glass substrate. The devices may be of a reflective type, a transmissive type or a transflective type. Use for the transmissive device is preferred. The composition can also be used for an amorphous silicon-TFT device or a polycrystal silicon-TFT device. The composition can also be used for a nematic curvilinear aligned phase (NCAP) device prepared by microencapsulating the composition, and for a polymer dispersed (PD) device in which a three-dimensional network-polymer is formed in the composition.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to, limit the scope of the invention.

EXAMPLES

The invention will be explained in greater detail by way of Examples. The invention is not restricted by the Examples. A prepared compound was identified by a method such as an NMR analysis. Characteristics of a compound and a composition were measured by the method described below.

NMR Analysis: DRX-500 made by Bruker BioSpin Corporation was used for measurement. In $^1$H-NMR measurement, a sample was dissolved in a deuterated solvent such as CDCl$_3$, and measurement was carried out under conditions of room temperature, 500 MHz and 16 times of accumulation. Tetramethylsilane was used as an internal standard. In $^{19}$F-NMR measurement, measurement was carried out using CFCl$_3$ as an internal standard under conditions of 24 times of accumulation. In the explanation of nuclear magnetic resonance spectra, s, d, t, q, quip, sex, m and br stand for a singlet, a doublet, a triplet, a quartet, a quintet, a sextet and a multiplet, and being broad, respectively.

Gas Chromatographic Analysis: GC-14B Gas Chromatograph made by Shimadzu Corporation was used for measurement. A carrier gas was helium (2 mL per minute). A sample injector and a detector (FID) were set to 280° C. and 300° C., respectively. A capillary column DB-1 (length 30 m, bore 0.32 mm, film thickness 0.25 μm; dimethylpolysiloxane as a stationary phase, non-polar) made by Agilent Technologies, Inc. was used for separation of component compounds. After the column was kept at 200° C. for 2 minutes, the column was heated to 280° C. at a rate of 5° C. per minute. A sample was prepared in an acetone solution (0.1% by weight), and then 1 microliter of the solution was injected into the sample injector. A recorder was C-R5A Chromatopac made by Shimadzu Corporation or the equivalent thereof. The resulting chromatogram showed a retention time of a peak and a peak area corresponding to each of the component compounds.

As a solvent for diluting the sample, chloroform, hexane and so forth may also be used. The following capillary columns may also be used for separating the component compounds: HP-1 (length 30 m, bore 0.32 mm, film thickness 0.25 μm) made by Agilent Technologies, Inc., Rtx-1 (length 30 m, bore 0.32 mm, film thickness 0.25 μm) made by Restek Corporation and BP-1 (length 30 m, bore 0.32 mm, film thickness 0.25 μm) made by SGE International Pty. Ltd. A capillary column CBP1-M50-025 (length 50 m, bore 0.25 mm, film thickness 0.25 μm) made by Shimadzu Corporation may also be used for the purpose of avoiding an overlap of peaks of the compounds.

A ratio of liquid crystal compounds to be contained in the composition may be calculated by the method as described below. A mixture of liquid crystal compounds is detected with a gas chromatograph (FID). A ratio of the peak areas in the gas chromatogram corresponds to a ratio (weight ratio) of the liquid crystal compounds. When the capillary columns described above were used, a correction coefficient of each of the liquid crystal compounds may be regarded as 1 (one). Accordingly, the ratio (% by weight) of the liquid crystal compounds can be calculated from the ratio of the peak areas.

Measurement Sample: When characteristics of a composition were measured, the composition was used as a sample as was. When characteristics of a compound were measured, a sample for measurement was prepared by mixing the compound (15% by weight) with a base liquid crystal (85% by weight). Values of characteristics of the compound were calculated using values obtained by measurement, according to an extrapolation method: (extrapolated value)={(measured value of a sample for measurement)−0.85×(measured value of base liquid crystal)}/0.15. When a smectic phase (or crystals) precipitated at the ratio thereof at 25° C., a ratio of the compound to the base liquid crystal was changed step by step in the order of (10% by weight:90% by weight), (5% by weight:95% by weight) and (1% by weight:99% by weight). Values of a maximum temperature, an optical anisotropy, viscosity and a dielectric anisotropy with regard to the compound were determined according to the extrapolation method.

The base liquid crystal described below was used. A ratio of a component compound was expressed in terms of % by weight.

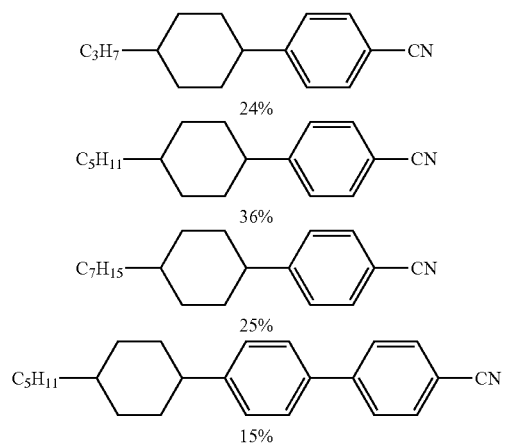

Measurement Method: Characteristics were measured according to the methods described below. Most of the measurement methods were applied as described in the Standard of the Japan Electronics and Information Technology Industries Association (hereinafter, abbreviated as JEITA) (JEITA EIAJ ED-2521B) discussed and established by JEITA, or modified thereon. No thin film transistor (TFT) was attached to a TN device used for measurement.

(1) Maximum temperature of a nematic phase (NI; ° C.): A sample was placed on a hot plate in a melting point apparatus equipped with a polarizing microscope and was heated at a rate of 1° C. per minute. Temperature when a part of the sample began to change from a nematic phase to an isotropic liquid was measured. A higher limit of a temperature range of the nematic phase may be occasionally abbreviated as "maximum temperature."

(2) Minimum temperature of a nematic phase ($T_c$; ° C.): Samples each having a nematic phase were put in glass vials and kept in freezers at temperatures of 0° C., −10° C., −20° C., −30° C. and −40° C. for 10 days, and then liquid crystal phases were observed. For example, when a sample maintained the nematic phase at −20° C. and changed to crystals or a smectic phase at −30° C., $T_c$ was expressed as $T_c$<−20° C. A lower limit of the temperature range of the nematic phase may be occasionally abbreviated as "minimum temperature."

(3) Viscosity (bulk viscosity; η; measured at 20° C.; mPa·s): A cone-plate type (E-type) rotational viscometer made by Tokyo Keiki Inc. was used for measurement.

(4) Viscosity (rotational viscosity; γ1; measured at 25° C.; mPa·s): Measurement was carried out according to the method described in M. Imai et al., Molecular Crystals and Liquid Crystals, Vol. 259, p. 37 (1995). A sample was put in a TN device in which a twist angle was 0 degrees and a gap (cell gap) between two glass substrates was 5 micrometers. A voltage was applied stepwise to the device in the range of 16 V to 19.5 V at an increment of 0.5 V. After a period of 0.2 second with no voltage, a voltage was applied repeatedly under the conditions of only one rectangular wave (rectangular pulse; 0.2 second) and no voltage (2 seconds). The peak current and the peak time of the transient current generated by the applied voltage were measured. A value of the rotational viscosity was obtained from the measured values and a calculation equation (8) described on page 40 of the paper presented by M. Imai et al. A dielectric anisotropy value necessary for the calculation was obtained by the method indicated below using the device that was used for measuring the rotational viscosity.

(5) Optical anisotropy (refractive index anisotropy; Δn; measured at 25° C.): Measurement was carried out by an Abbe refractometer with a polarizing plate mounted on an ocular, using light at a wavelength of 589 nanometers. A surface of a main prism was rubbed in one direction, and then a sample was added dropwise onto the main prism. A refractive index (n∥) was measured when the direction of polarized light was parallel to the direction of rubbing. A refractive index (n⊥) was measured when the direction of polarized light was perpendicular to the direction of rubbing. A value of optical anisotropy was calculated from an equation: Δn=n∥−⊥.

(6) Dielectric Anisotropy (Δ∈; measured at 25° C.): A sample was put in a TN device in which a distance (cell gap) between two glass substrates was 9 micrometers and a twist angle was 80 degrees. Sine waves (10 V, 1 kHz) were applied to the device, and after 2 seconds, a dielectric constant (∈∥) in the major axis direction of liquid crystal molecules was measured. Sine waves (0.5 V, 1 kHz) were applied to the device, and after 2 seconds, a dielectric constant (∈⊥) in the minor axis direction of the liquid crystal molecules was measured. A value of dielectric anisotropy was calculated from an equation: Δ∈=∈∥−∈⊥.

(7) Threshold voltage (Vth; measured at 25° C.; V): An LCD-5100 luminance meter made by Otsuka Electronics Co., Ltd. was used for measurement. A light source was a halogen lamp. A sample was put in a normally white mode TN device in which a distance (cell gap) between two glass substrates was 0.45/Δn micrometers and a twist angle was 80 degrees. A voltage (32 Hz, rectangular waves) to be applied to the device was increased stepwise from 0 V to 10 V at an increment of 0.02 V. On the occasion, the device was irradiated with light from a direction perpendicular to the device, and the amount of light passing through the device was measured. A voltage-transmittance curve was prepared, in which the maximum amount of light corresponds to 100% transmittance and the minimum amount of light corresponds to 0% transmittance. A threshold voltage is a voltage at 90% transmittance.

(8) Voltage holding ratio (VHR-1; measured at 25° C.; %): A TN device used for measurement had a polyimide alignment film, and a distance (cell gap) between two glass substrates was 5 micrometers. A sample was put in the device, and then the device was sealed with an ultraviolet-curable adhesive. A pulse voltage (60 microseconds at 5 V) was applied to the TN device and the device was charged. A decaying voltage was measured for 16.7 milliseconds with a high-speed voltmeter, and area A between a voltage curve and a horizontal axis in a unit cycle was determined. Area B was an area without decay. A voltage holding ratio was expressed as a percentage of area A to area B.

(9) Voltage holding ratio (VHR-2; measured at 80° C.; %): A voltage holding ratio was measured in a manner identical with the procedures as described above except that measurement was carried out at 80° C. in place of 25° C. The value obtained was described in terms of VHR-2.

(10) Voltage holding ratio (VHR-3; measured at 25° C.; %): Stability to ultraviolet light was evaluated by measuring a voltage holding ratio after a device was irradiated with ultraviolet light. A TN device used for measurement had a polyimide alignment film, and a cell gap was 5 micrometers. A sample was injected into the device, and then the device was irradiated with light for 20 minutes. A light source was an ultra high-pressure mercury lamp USH-500D (made by Ushio, Inc.), and a distance between the device and the light source was 20 centimeters. In VHR-3 measurement, a decaying voltage was measured for 16.7 milliseconds. A composition having a large VHR-3 has a large stability to ultraviolet light. A value of VHR-3 is preferably 90% or more, further preferably, 95% or more.

(11) Voltage holding ratio (VHR-4; measured at 25° C.; %): A TN device into which a sample was injected was heated in a constant-temperature bath at 80° C. for 500 hours, and then stability to heat was evaluated by measuring a voltage holding ratio. In VHR-4 measurement, a decaying voltage was measured for 16.7 milliseconds. A composition having a large VHR-4 has a large stability to heat.

(12) Response time (i; measured at 25° C.; ms): An LCD-5100 luminance meter made by Otsuka Electronics Co., Ltd. was used for measurement. A light source was a halogen lamp. A low-pass filter was set at 5 kHz. A sample was put in a normally white mode TN device in which a distance (cell gap) between two glass substrates was 5.0 micrometers and a twist angle was 80 degrees. Rectangular waves (60 Hz, 5 V, 0.5 second) were applied to the device. On the occasion, the device was irradiated with light from a direction perpendicular to the device, and the amount of light transmitted through the device was measured. The maximum amount of light corresponds to 100% transmittance, and the minimum amount of light corresponds to 0% transmittance. Rise time (τr; millisecond) is a period of time needed for a change from 90% transmittance to 0% transmittance. Fall time (τf: millisecond) is a period of time needed for a change from 10% of transmittance to 90%. Response time was represented by a sum of the thus determined rise time and fall time.

(13) Elastic constant (K; measured at 25° C.; pN): HP4284A LCR Meter made by YOKOGAWA-Hewlett-Packard Co. was used for measurement. A sample was put in a horizontal alignment device in which a distance (cell gap) between two glass substrates was 20 micrometers. An electric charge of 0 V to 20 V was applied to the device, and electrostatic capacity and applied voltage were measured. Measured values of electrostatic capacity (C) and applied voltage (V) were fitted to equation (2.98) and equation (2.101) on page 75 of the "Liquid Crystal Device Handbook (Ekisho Debaisu Handobukku, in Japanese)" (The Nikkan Kogyo Shimbun, Ltd.), and values of K11 and K33 were obtained from equation (2.99). Next, K22 was calculated using previously obtained values of K11 and K33 in formula (3.18) on page 171. The elastic constant was represented with by an average of the thus determined K11, K22 and K33.

(14) Specific resistance (p; measured at 25° C.; Ωcm): Into a vessel equipped with electrodes, 1.0 milliliter of a sample was injected. A DC voltage (10 V) was applied to the vessel, and a DC current after 10 seconds was measured. A specific resistance was calculated from the following equation: (specific resistance)={(voltage)×(electric capacity of a vessel)}/[(direct current)×(dielectric constant of vacuum)].

(15) Helical pitch (P; measured at room temperature; μm): A helical pitch was measured according to a wedge method. See "Handbook of Liquid Crystals (Ekisho Binran in Japanese)," page 196, (Maruzen Co., Ltd., issued in 2000)). A sample was injected into a wedge cell and left to stand at room temperature for 2 hours, and then a gap (d2−d1) between disclination lines was observed by a polarizing microscope (trade name: MM40/60 Series, Nikon Corporation). A helical pitch (P) was calculated according to the following equation in which an angle of the wedge cell was expressed as θ: P=2×(d2−d1)×tan θ.

Compounds in Examples were expressed using symbols according to definitions in the Table below. In Table 3, a configuration of 1,4-cyclohexylene is trans. A parenthesized number next to a symbolized compound corresponds to the number of the compound. A symbol (−) means any other liquid crystal compound. A ratio (percentage) of a liquid crystal compound is expressed in terms of weight percent (% by weight) based on the weight of the liquid crystal composition. Values of characteristics of the composition were summarized in the last part.

TABLE 3

| Method for Description of Compounds using Symbols R—(A$_1$)—Z$_1$— . . . —Z$_n$—(A$_n$)—R' | |
|---|---|
| 1) Left-terminal Group R— | Symbol |
| C$_n$H$_{2n+1}$— | n- |
| C$_n$H$_{2n+1}$O— | nO— |
| C$_m$H$_{2m+1}$OC$_n$H$_{2n}$— | mOn- |
| CH$_2$=CH— | V— |
| C$_n$H$_{2n+1}$—CH=CH— | nV— |
| CH$_2$=CH—C$_n$H$_{2n}$— | Vn- |
| C$_m$H$_{2m+1}$—CH=CH—C$_n$H$_{2n}$— | mVn- |
| CF$_2$=CH— | VFF— |
| CF$_2$=CH—C$_n$H$_{2n}$— | VFFn- |
| 2) Right-terminal Group- | Symbol |
| —C$_n$H$_{2n+1}$ | -n |
| —OC$_n$H$_{2n+1}$ | —On |
| —CH=CH$_2$ | —V |
| —CH=CH—C$_n$H$_{2n+1}$ | —Vn |

TABLE 3-continued

Method for Description of Compounds using Symbols
R—(A₁)—Z₁—...—Zₙ—(Aₙ)—R'

| | |
|---|---|
| —CₙH₂ₙ—CH=CH₂ | -nV |
| —CₙH₂ₙ—CH=CH—CₘH₂ₘ₊₁ | -nVm |
| —CH=CF₂ | —VFF |
| —COOCH₃ | —EMe |
| —F | —F |
| —Cl | —CL |
| —OCF₃ | —OCF3 |
| —CF₃ | —CF3 |
| —CN | —C |
| —CF=CH—CF₃ | —FVCF3 |

| 3) Bonding Group —Zn— | Symbol |
|---|---|
| —C₂H₄— | 2 |
| —COO— | E |
| —CH=CH— | V |
| —C≡C— | T |
| —CF₂O— | X |
| —CH₂O— | 1O |

| 4) Ring Structure —An— | Symbol |
|---|---|
|  | H |
| 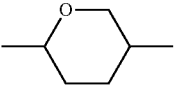 | Dh |
| 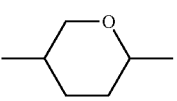 | dh |
|  | B |
| 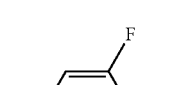 | B(F) |
| 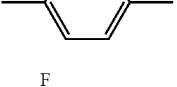 | B(2F) |
| 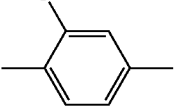 | B(F,F) |
| 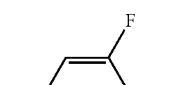 | B(2F,5F) |
| 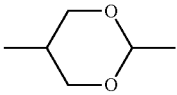 | G |
| 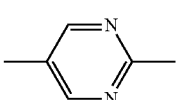 | Py |

5) Examples of Description

Example 1  3-HH-V1

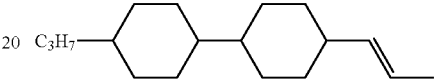

Example 2  3-BB(F)B(F,F)-F

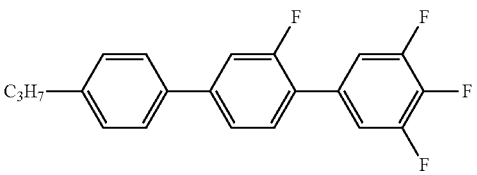

Example 3  4-BB(F)B(F,F)XB(F,F)-F

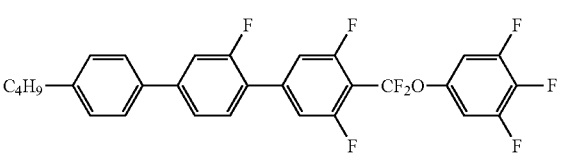

Example 4  5-GB(F,F)XB(F)-FVCF3

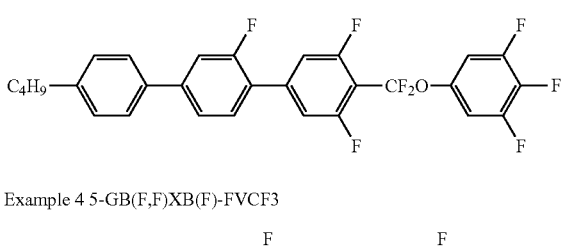

Example 1

| | | |
|---|---|---|
| 5-HXB(F,F)-FVCF3 | (1-1) | 10% |
| 5-HHB(F,F)XB(F)-FVCF3 | (1-5) | 3% |
| 3-HBBXB(F,F)-FVCF3 | (1-6) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-BBXB(F,F)-F | (4-15) | 5% |
| 3-HBB(F,F)XB(F,F)-F | (4-21) | 5% |
| 5-HBB(F,F)XB(F,F)-F | (4-21) | 7% |
| 3-BB(F)B(F,F)XB(F,F)-F | (4-25) | 3% |
| 4-BB(F)B(F,F)XB(F,F)-F | (4-25) | 9% |

NI = 78.7° C.; Tc < −20° C.; Δn = 0.105; Δε = 10.4; Vth = 1.53 V; η = 9.4 mPa · s; γ1 = 78.4 mPa · s.

Comparative Example 1

A composition in Example 1 contains compounds (1) as a first component. Compound (1) has a positive dielectric anisotropy. Compound (4) also has a positive dielectric anisotropy. For comparison, a composition was prepared as Comparative Example 1 in which three compounds being the first components in Example 1 were replaced by compounds (4).

| | | |
|---|---|---|
| 5-HXB(F,F)-F | (4-2) | 10% |
| 5-HHB(F,F)XB(F)-F | (4) | 3% |
| 3-HBBXB(F,F)-F | (4-20) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-BBXB(F,F)-F | (4-15) | 5% |
| 3-HBB(F,F)XB(F,F)-F | (4-21) | 5% |
| 5-HBB(F,F)XB(F,F)-F | (4-21) | 7% |
| 3-BB(F)B(F,F)XB(F,F)-F | (4-25) | 3% |
| 4-BB(F)B(F,F)XB(F,F)-F | (4-25) | 9% |

NI = 72.9° C.; Tc < −20° C.; Δn = 0.098; Δε = 8.0; Vth = 1.70 V; η = 8.6 mPa · s.

Example 2

| | | |
|---|---|---|
| 3-HHXB(F,F)-FVCF3 | (1-2) | 5% |
| 3-GB(F,F)XB(F,F)-FVCF3 | (1-3) | 5% |
| 3-BB(F,F)XB(F)B(F,F)-FVCF3 | (1-10) | 3% |
| 3-HH-V | (2) | 20% |
| 3-HH-V1 | (2) | 10% |
| 1V2-HH-1 | (2) | 12% |
| V2-HHB-1 | (3-4) | 6% |
| 3-GB(F,F)XB(F,F)-F | (4-12) | 5% |
| 3-BB(F)B(F,F)-CF3 | (4-14) | 3% |
| 3-HBBXB(F,F)-F | (4-20) | 7% |
| 4-GB(F)B(F,F)XB(F,F)-F | (4-23) | 6% |
| 3-BB(F)B(F,F)XB(F)-F | (4-24) | 3% |
| 3-BB(F)B(F,F)XB(F,F)-F | (4-25) | 3% |
| 4-BB(F)B(F,F)XB(F,F)-F | (4-25) | 9% |
| 5-BB(F)B(F,F)XB(F)B(F,F)-F | (4-27) | 3% |

NI = 80.2° C.; Tc < −20° C.; Δn = 0.113; Δε = 17.0; Vth = 1.14 V; η = 15.1 mPa · s; γ1 = 84.5 mPa · s.

Example 3

| | | |
|---|---|---|
| 3-BB(F,F)XB(F,F)-FVCF3 | (1-4) | 5% |
| 3-HBB(F)-FVCF3 | (1-12) | 6% |
| 3-GB(F)B(F)-FVCF3 | (1-13) | 5% |
| 5-HH-V | (2) | 37% |
| 1-BB(F)B-2V | (3-6) | 5% |
| 3-BB(F)B-2V | (3-6) | 5% |
| 3-HB-CL | (4-1) | 4% |
| 3-HHXB(F,F)-F | (4-5) | 4% |
| 3-BB(F,F)XB(F,F)-F | (4-16) | 6% |
| 5-GBB(F)B(F,F)-F | (4-19) | 5% |
| 3-BB(F)B(F,F)XB(F)-F | (4-24) | 5% |
| 4-BB(F)B(F,F)XB(F)-F | (4-24) | 3% |
| 3-BB(F,F)XB(F)B(F,F)-F | (4-26) | 7% |
| 5-BB(F)B(F,F)XB(F)B(F,F)-F | (4-27) | 3% |

NI = 79.1° C.; Tc < −20° C.; Δn = 0.132; Δε = 14.1; Vth = 1.31 V; η = 17.4 mPa · s; γ1 = 85.5 mPa · s.

Example 4

| | | |
|---|---|---|
| 3-dhBB(F,F)XB(F,F)-FVCF3 | (1-7) | 3% |
| 3-BB(F)B(F,F)-FVCF3 | (1-14) | 5% |
| 3-HH-V | (2) | 38% |
| 3-HH-V1 | (2) | 3% |
| 3-HH-VFF | (2) | 4% |
| V2-BB-1 | (3-2) | 3% |
| 1-BB-3 | (3-2) | 3% |
| 1V-HBB-2 | (3-5) | 4% |
| 2-BB(F)B-3 | (3-6) | 3% |
| 5-HBB(F)B-3 | (3-12) | 3% |
| 5-HXB(F,F)-F | (4-2) | 3% |
| 5-HHBB(F,F)-F | (4-17) | 5% |
| 3-HBB(F,F)XB(F,F)-F | (4-21) | 5% |
| 4-GB(F)B(F,F)XB(F,F)-F | (4-23) | 3% |
| 5-GB(F)B(F,F)XB(F,F)-F | (4-23) | 3% |
| 4-BB(F)B(F,F)XB(F,F)-F | (4-25) | 8% |
| 5-BB(F)B(F,F)XB(F,F)-F | (4-25) | 4% |

NI = 81.0° C.; Tc < −20° C.; Δn = 0.119; Δε = 10.6; Vth = 1.50 V; η = 9.8 mPa · s; γ1 = 79.2 mPa · s.

Example 5

| | | |
|---|---|---|
| 5-GB(F)B(F,F)XB(F,F)-FVCF3 | (1-8) | 39% |
| 4-BB(F)B(F,F)XB(F,F)-FVCF3 | (1-9) | 3% |
| 3-HH-V | (2) | 38% |
| 1V2-HH-3 | (2) | 5% |
| V-HHB-1 | (3-4) | 3% |
| 1-BB(F)B-2V | (3-6) | 5% |
| 5-HB(F)BH-3 | (3-11) | 7% |
| 3-GHB(F,F)-F | (4-7) | 7% |
| 5-HGB(F,F)-F | (4-6) | 3% |
| 3-HBEB(F,F)-F | (4-10) | 3% |
| 3-BB(F,F)XB(F,F)-F | (4-16) | 8% |
| 3-HBBXB(F,F)-F | (4-20) | 5% |
| 4-GB(F)B(F,F)XB(F,F)-F | (4-23) | 4% |
| 5-GB(F)B(F,F)XB(F,F)-F | (4-23) | 3% |
| 3-HH-O1 | (—) | 3% |

NI = 81.6° C.; Tc < −20° C.; Δn = 0.101; Δε = 10.9; Vth = 1.46 V; η = 9.9 mPa · s; γ1 = 79.5 mPa · s.

Example 6

| | | |
|---|---|---|
| 5-HXB(F,F)-FVCF3 | (1-1) | 10% |
| 3-BB(F,F)XB(F)B(F,F)-FVCF3 | (1-10) | 3% |
| 5-HH-V | (2) | 25% |
| 3-HH-V1 | (2) | 10% |
| 1V2-HH-3 | (2) | 5% |
| 3-HB-O2 | (3-1) | 3% |
| 1-BB(F)B-2V | (3-6) | 4% |
| 5-B(F)BB-2 | (3-7) | 3% |
| 3-HHXB(F,F)-F | (4-5) | 5% |
| 3-BB(F)B(F,F)-F | (4-13) | 4% |
| 3-HBBXB(F,F)-F | (4-20) | 12% |
| 4-BB(F)B(F,F)XB(F,F)-F | (4-25) | 8% |
| 3-BB(F,F)XB(F)B(F,F)-F | (4-26) | 8% |

NI = 80.1° C.; Tc < −20° C.; Δn = 0.118; Δε = 11.6; Vth = 1.39 V; η = 10.2 mPa · s; γ1 = 80.1 mPa · s.

Example 7

| | | |
|---|---|---|
| 3-HHXB(F,F)-FVCF3 | (1-2) | 5% |
| 3-BB(F,F)XB(F)B(F,F)-FVCF3 | (1-10) | 3% |
| 3-HBB(F)-FVCF3 | (1-12) | 5% |
| 3-HH-V | (2) | 32% |

-continued

| 3-HH-V1 | (2) | 8% |
|---|---|---|
| 4-HHEH-3 | (3-3) | 3% |
| VFF-HHB-1 | (3-4) | 2% |
| 3-HB(F)HH-2 | (3-8) | 5% |
| 3-HHEB(F,F)-F | (4-4) | 5% |
| 3-BB(F)B(F,F)-CF3 | (4-14) | 4% |
| 3-BB(F,F)XB(F,F)-F | (4-16) | 5% |
| 3-HHBB(F,F)-F | (4-17) | 3% |
| 5-GBB(F)B(F,F)-F | (4-19) | 3% |
| 3-HBBXB(F,F)-F | (4-20) | 5% |
| 4-GB(F)B(F,F)XB(F,F)-F | (4-23) | 6% |
| 5-GB(F)B(F,F)XB(F,F)-F | (4-23) | 4% |
| 2-HH-3 | (—) | 2% |

NI = 91.8° C.; Tc < −20° C.; Δn = 0.102; Δε = 11.6; Vth = 1.38 V; η = 14.9 mPa · s; γ1 = 84.2 mPa · s.

Example 8

| 3-GB(F,F)XB(F,F)-FVCF3 | (1-3) | 5% |
|---|---|---|
| 3-HBBXB(F,F)-FVCF3 | (1-6) | 3% |
| 3-BB(F)B(F,F)-FVCF3 | (1-14) | 5% |
| 3-HH-V | (2) | 33% |
| V2-BB-1 | (3-2) | 6% |
| 3-HHB-1 | (3-4) | 5% |
| 5-HBBH-3 | (3-10) | 3% |
| 3-HBB(F,F)-F | (4-8) | 3% |
| 5-HBB(F,F)-F | (4-8) | 4% |
| 3-GB(F,F)XB(F,F)-F | (4-12) | 9% |
| 3-BB(F)B(F,F)-CF3 | (4-14) | 4% |
| 3-HBBXB(F,F)-F | (4-20) | 5% |
| 5-HBBXB(F,F)-F | (4-20) | 4% |
| 4-GB(F)B(F,F)XB(F,F)-F | (4-23) | 5% |
| 4-BB(F)B(F,F)XB(F,F)-F | (4-25) | 6% |

NI = 74.1° C.; Tc < −20° C.; Δn = 0.114; Δε = 15.3; Vth = 1.24 V; η = 12.5 mPa · s; γ1 = 82.2 mPa · s.

Example 9

| 3-BB(F,F)XB(F,F)-FVCF3 | (1-4) | 5% |
|---|---|---|
| 5-HHB(F,F)XB(F)-FVCF3 | (1-5) | 3% |
| 4-BB(F)B(F,F)XB(F,F)-FVCF3 | (1-9) | 3% |
| 3-HH-V | (2) | 35% |
| 1V2-BB-1 | (3-2) | 6% |
| 3-HHEH-3 | (3-3) | 3% |
| 3-HB(F)HH-2 | (3-8) | 3% |
| 3-HHEBH-3 | (3-9) | 3% |
| 5-HB(F)BH-3 | (3-11) | 3% |
| 3-HGB(F,F)-F | (4-6) | 4% |
| 5-GHB(F,F)-F | (4-7) | 4% |
| 3-HBB(F,F)-F | (4-8) | 3% |
| 3-BBXB(F,F)-F | (4-15) | 7% |
| 3-BB(F,F)XB(F,F)-F | (4-16) | 5% |
| 3-HBB(F,F)XB(F,F)-F | (4-21) | 3% |
| 4-BB(F)B(F,F)XB(F,F)-F | (4-25) | 3% |
| 3-BB(F,F)XB(F)B(F,F)-F | (4-26) | 4% |
| 5-BB(F)B(F,F)XB(F)B(F,F)-F | (4-27) | 3% |

NI = 77.5° C.; Tc < −20° C.; Δn = 0.110; Δε = 12.9; Vth = 1.28 V; η = 11.3 mPa · s; γ1 = 81.1 mPa · s.

Example 10

| 3-dhBB(F,F)XB(F,F)-FVCF3 | (1-7) | 3% |
|---|---|---|
| 3-GB(F)B(F)-FVCF3 | (1-13) | 5% |
| 5-HH-V | (2) | 35% |
| 3-HH-V1 | (2) | 6% |
| 1V2-HH-3 | (2) | 4% |

-continued

| 5-HB-CL | (4-1) | 4% |
|---|---|---|
| 1-BB(F)B-2V | (3-6) | 5% |
| 2-BB(F)B-2V | (3-6) | 4% |
| 3-HB(F)HH-2 | (3-8) | 3% |
| 3-HHEBH-3 | (3-9) | 3% |
| 1O1-HBBH-3 | (—) | 3% |
| 1O1-HBBH-5 | (—) | 3% |
| 3-BBXB(F,F)-F | (4-15) | 4% |
| 4-HHEB(F,F)-F | (4-4) | 3% |
| 3-GB(F)B(F,F)XB(F,F)-F | (4-23) | 3% |
| 4-GB(F)B(F,F)XB(F,F)-F | (4-23) | 5% |
| 3-BB(F,F)XB(F)B(F,F)-F | (4-26) | 7% |

NI = 98.6° C.; Tc < −20° C.; Δn = 0.116; Δε = 10.2; Vth = 1.55 V; η = 11.1 mPa · s; γ1 = 81.0 mPa · s.

Example 11

| 3-HBBXB(F,F)-FVCF3 | (1-6) | 3% |
|---|---|---|
| 5-GB(F)B(F,F)XB(F,F)-FVCF3 | (1-8) | 3% |
| 3-HH-V | (2) | 38% |
| 7-HB-1 | (3-1) | 3% |
| V-HHB-1 | (3-4) | 7% |
| 5-HBB(F)B-2 | (3-12) | 4% |
| 3-HHB(F,F)-F | (4-3) | 3% |
| 3-HB(F)B(F,F)-F | (4-9) | 3% |
| 3-GB(F)B(F,F)-F | (4-11) | 3% |
| 3-BBXB(F,F)-F | (4-15) | 5% |
| 4-HHB(F)B(F,F)-F | (4-18) | 5% |
| 3-HBB(F,F)XB(F,F)-F | (4-21) | 3% |
| 5-HBB(F,F)XB(F,F)-F | (4-21) | 7% |
| 3-dhBB(F,F)XB(F,F)-F | (4-22) | 4% |
| 4-BB(F)B(F,F)XB(F,F)-F | (4-25) | 9% |

NI = 88.5° C.; Tc < −20° C.; Δn = 0.111; Δε = 11.4; Vth = 1.41 V; η = 12.6 mPa · s; γ1 = 82.3 mPa · s.

The dielectric anisotropy (Δε) of the composition in Comparative Example 1 was 8.0. On the other hand, the dielectric anisotropy of the compositions in Example 1 to Example 8 was 10.2 to 17.0. Thus, the composition in Examples had a larger dielectric anisotropy in comparison with the composition in Comparative Example. Therefore, the liquid crystal composition of the invention is concluded to have superb characteristics.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

Industrial Applicability

The liquid crystal composition of the invention satisfies at least one of characteristics such as a high maximum temperature, a low minimum temperature, a small viscosity, a suitable optical anisotropy, a large dielectric anisotropy, a large specific resistance, a large elastic constant, a high stability to ultraviolet light, a high stability to heat and a large elastic constant, or has a suitable balance regarding at least two of the characteristics. A liquid crystal display device including the composition has a short response time, a large voltage holding ratio, a large contrast ratio, a long service life and so forth, and therefore can be used for a liquid crystal projector, a liquid crystal television and so forth.

What is claimed is:

1. A liquid crystal composition that has a nematic phase and contains at least one compound selected from the group of compounds represented by formula (1) as a first component and at least one compound selected from the group of compounds represented by formula (2) as a second component and:

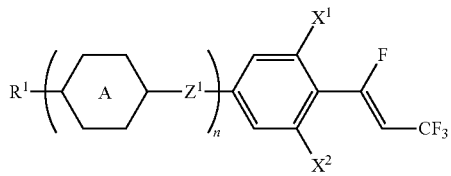
(1)

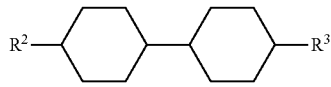
(2)

wherein, in formula (1) and formula (2), $R^1$ and $R^2$ are independently alkyl having 1 to 12 carbons, alkoxy having 1 to 12 carbons or alkenyl having 2 to 12 carbons; $R^3$ is alkenyl having 2 to 12 carbons, or alkenyl having 2 to 12 carbons in which at least of one of hydrogen is replaced by fluorine; ring A is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^1$ is a single bond, ethylene, vinylene, methyleneoxy, carbonyloxy or difluoromethyleneoxy; X' and $X^2$ are independently hydrogen or fluorine; and n is 1, 2, 3 or 4.

2. The liquid crystal composition according to claim 1, containing at least one compound selected from the group of compounds represented by formula (1-1) to formula (1-14) as the first component:

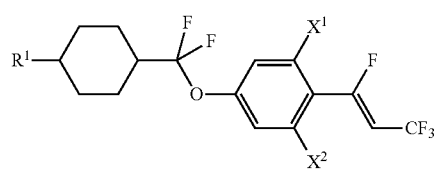
(1-1)

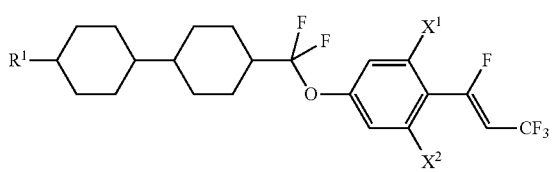
(1-2)

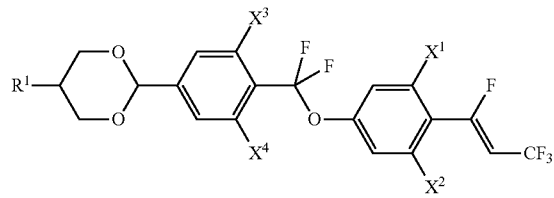
(1-3)

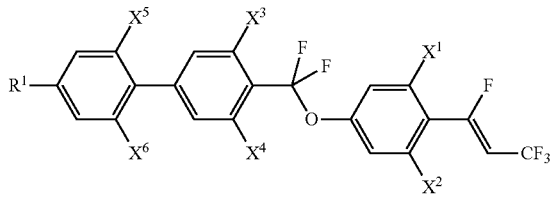
(1-4)

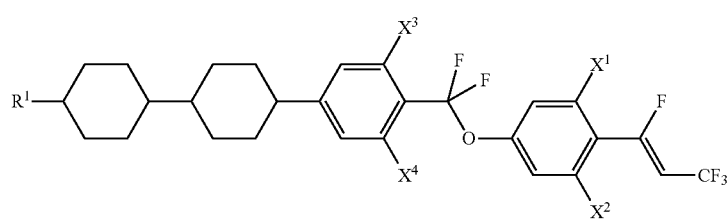
(1-5)

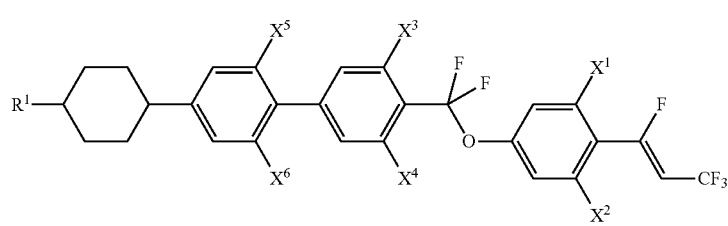
(1-6)

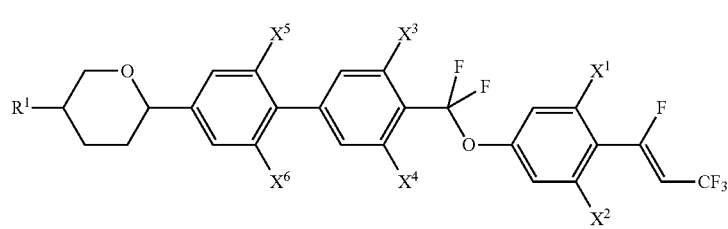
(1-7)

-continued (1-8)
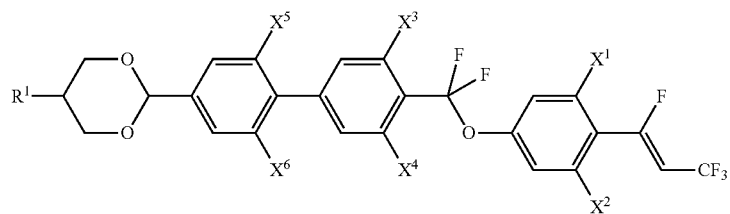

(1-9)
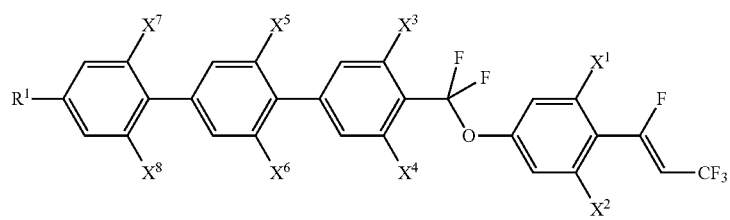

(1-10)
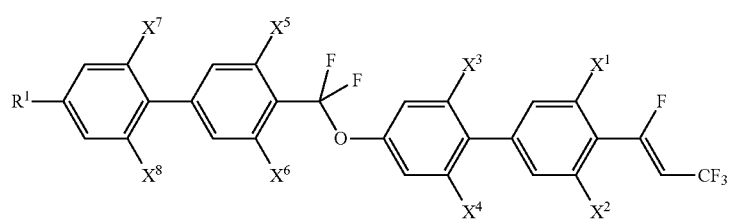

(1-11)
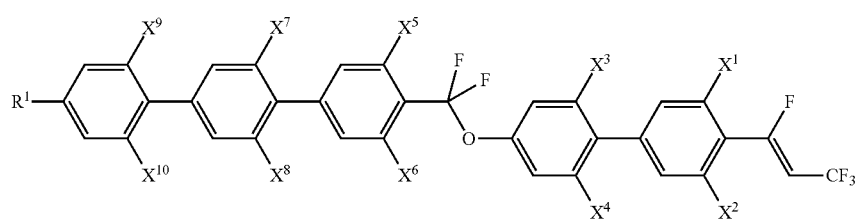

(1-12) (1-13)
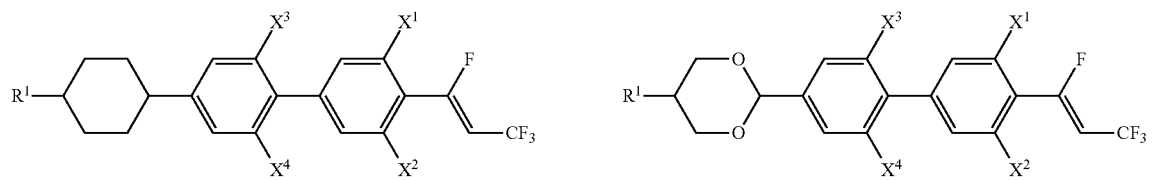

(1-14)
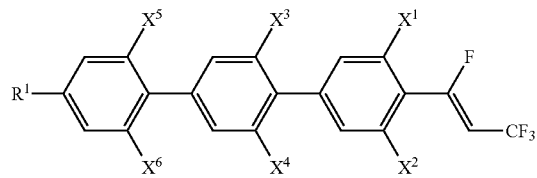

wherein, in formula (1-1) to formula (1-14), $R^1$ is alkyl having 1 to 12 carbons, alkoxy having 1 to 12 carbons or alkenyl having 2 to 12 carbons; and $X^1$, $X^2$, $X^3$, $X^4$, $X^5$, $X^6$, $X^7$, $X^8$, $X^9$ and $X^{10}$ are independently hydrogen or fluorine.

3. The liquid crystal composition according to claim 1, wherein a ratio of the first component is in the range of 5 to 30% by weight and a ratio of the second component is in the range of 15 by 60% by weight, based on the weight of the liquid crystal composition.

4. The liquid crystal composition according to claim 1, further containing at least one compound selected from the group of compounds represented by formula (3) as a third component:

(3)
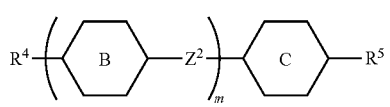

wherein, in formula (3), $R^4$ and $R^5$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine; ring B and ring C are independently 1,4-cyclohexylene, 1,4-phenylene, 2-fluoro-1,4-phenylene or 2,5-difluoro-1,4-phenylene; $Z^2$ is a single bond, ethylene or carbonyloxy; m is 1, 2 or 3; and however, when m is 1, ring C is 1,4-phenylene.

5. The liquid crystal composition according to claim 1, containing at least one compound selected from the group of compounds represented by formula (3-1) to formula (3-12) as the third component:

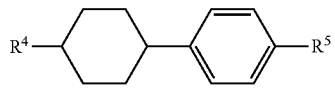
(3-1)

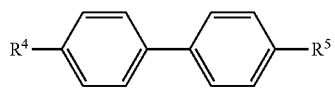
(3-2)

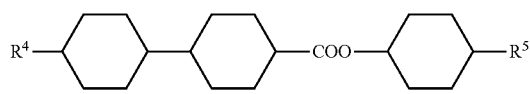
(3-3)

(3-4)

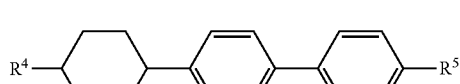
(3-5)

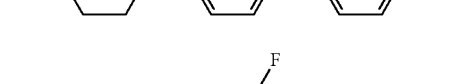
(3-6)

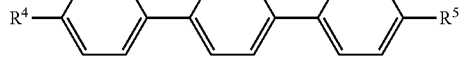
(3-7)

(3-8)

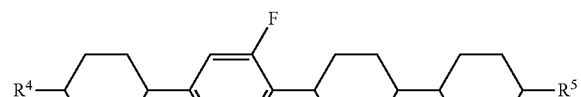
(3-9)

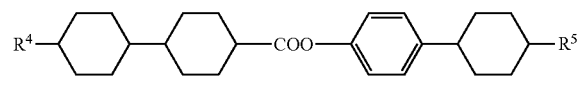
(3-10)

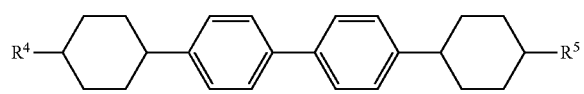
(3-11)

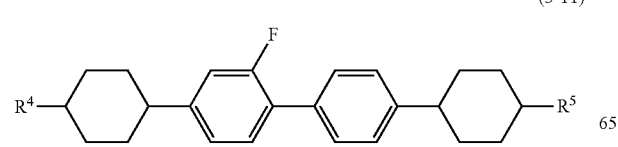

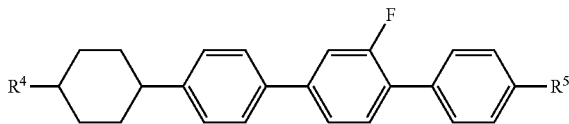
(3-12)

wherein, in formula (3-1) to formula (3-12), $R^4$ and $R^5$ are independently alkyl having 1 to 12 carbons, alkoxy having 1 to 12 carbons, alkenyl having 2 to 12 carbons, or alkenyl having 2 to 12 carbons in which at least one of hydrogen is replaced by fluorine.

6. The liquid crystal composition according to claim 4, wherein a ratio of the third component is in the range of 5% by weight to 35% by weight based on the weight of the liquid crystal composition.

7. The liquid crystal composition according to claim 1, further containing at least one compound selected from the group of compounds represented by formula (4) as a fourth component:

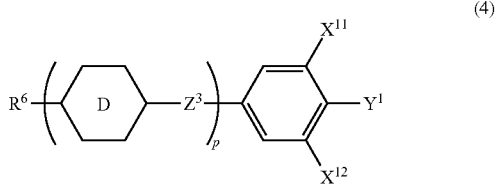
(4)

wherein, in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{11}$ and $X^{12}$ are independently hydrogen or fluorine; $Y^1$ is fluorine, chlorine, trifluoromethyl or trifluoromethoxy; and p is 1, 2, 3 or 4.

8. The liquid crystal composition according to claim 4, further containing at least one compound selected from the group of compounds represented by formula (4) as the fourth component:

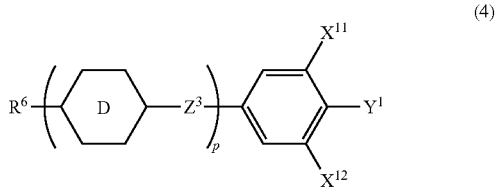
(4)

wherein, in formula (4), $R^6$ is alkyl having 1 to 12 carbons, alkoxy having 1 to 12 carbons or alkenyl having 2 to 12 carbons; ring D is 1,4-cyclohexylene, 1,4-phenylene, 2-fluoro-1,4-phenylene, 2,6-difluoro-1,4-phenylene, pyrimidine-2,5-diyl, 1,3-dioxane-2,5-diyl or tetrahydropyran-2,5-diyl; $Z^3$ is a single bond, ethylene, carbonyloxy or difluoromethyleneoxy; $X^{11}$ and $X^{12}$ are independently hydrogen or fluorine; $Y^1$ is fluorine, chlorine, trifluoromethyl or trifluoromethoxy; and p is 1, 2, 3 or 4.

9. The liquid crystal composition according to claim 1, containing at least one compound selected from the group of compounds represented by formula (4-1) to (4-27) as the fourth component:
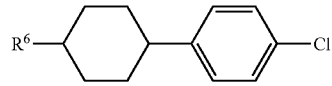 (4-1)
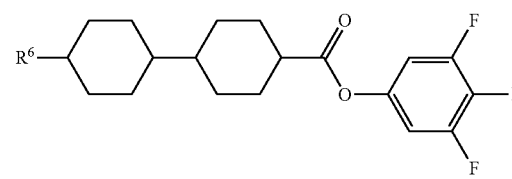 (4-2)
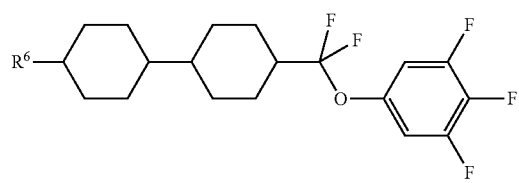 (4-3)
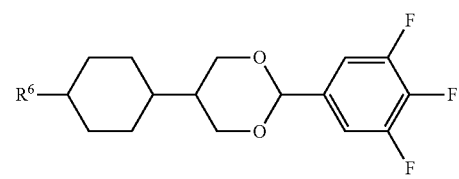 (4-4)
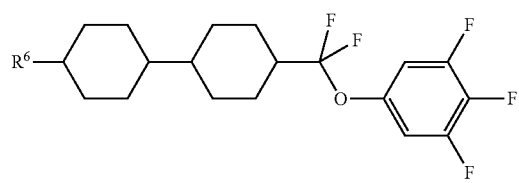 (4-5)
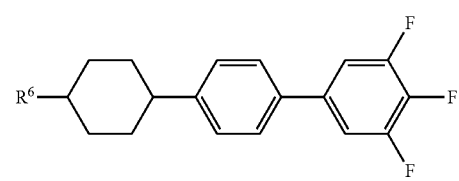 (4-6)
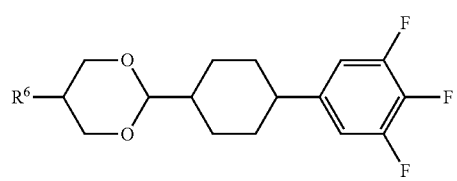 (4-7)
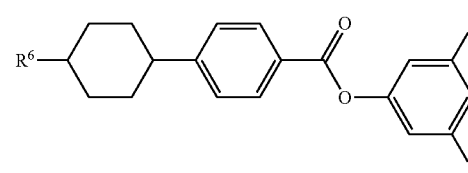 (4-8)
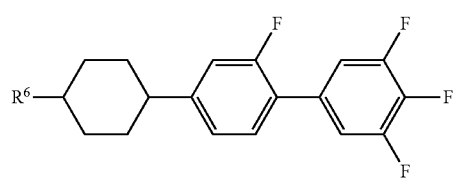 (4-9)
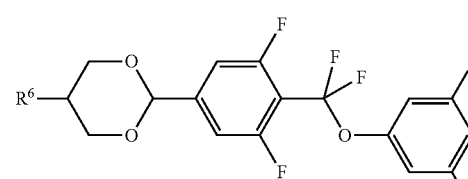 (4-10)
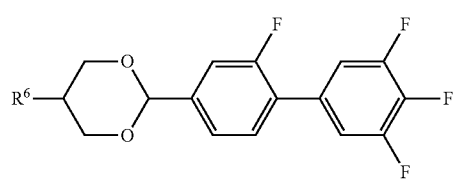 (4-11)
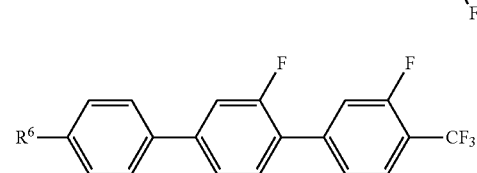 (4-12)
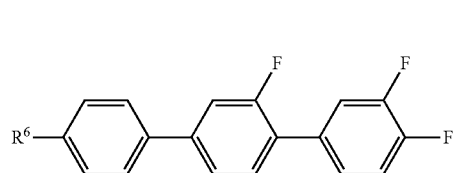 (4-13)
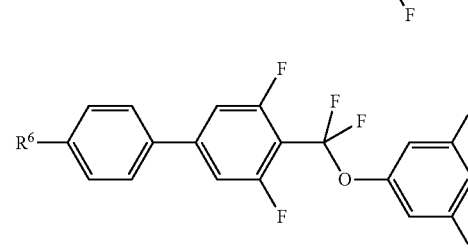 (4-14)
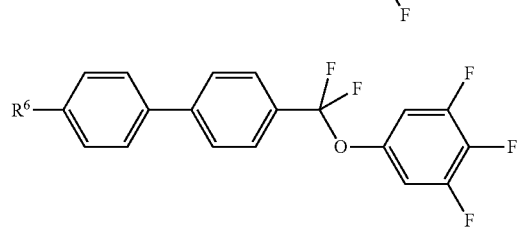 (4-15)
(4-16)

-continued
(4-17)
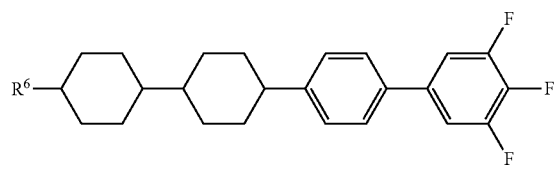
(4-18)
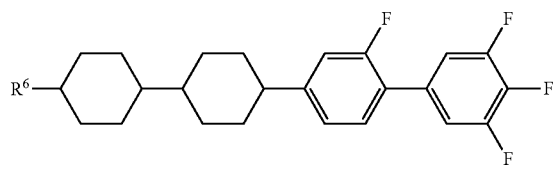
(4-19)
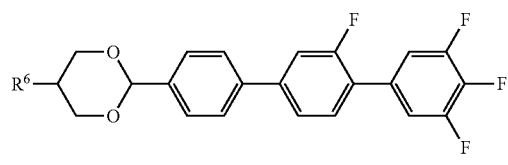
(4-20)
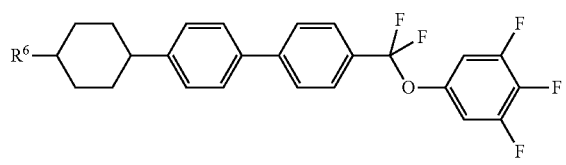
(4-21)
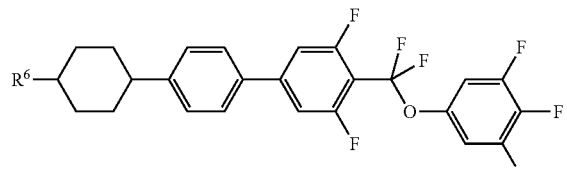
(4-22)
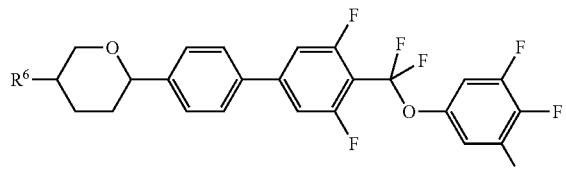
(4-23)
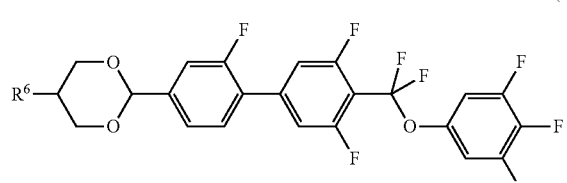
(4-24)
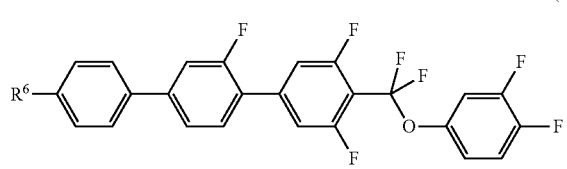
(4-25)
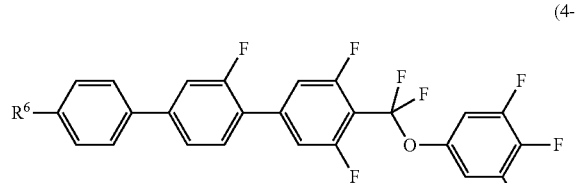
(4-26)
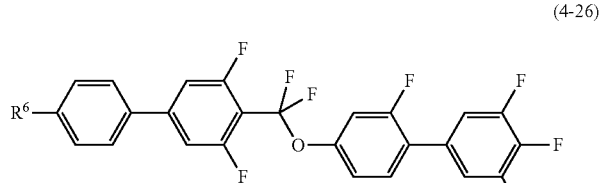
(4-27)
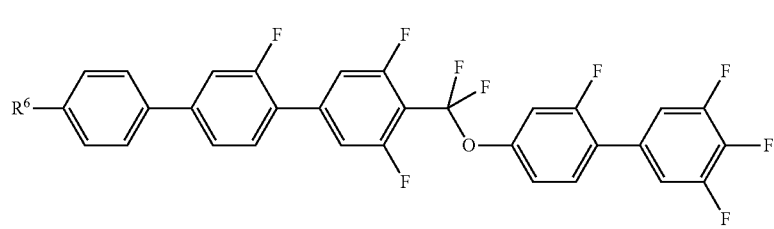
wherein, in formula (4-1) to formula (4-27), $R^6$ is alkyl having 1 to 12 carbons, alkoxy having 1 to 12 carbons or alkenyl having 2 to 12 carbons.
10. The liquid crystal composition according to claim 4, containing at least one compound selected from the group of compounds represented by formula (4-1) to (4-27) as the fourth component:
(4-1)
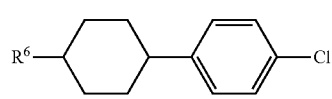
(4-2)
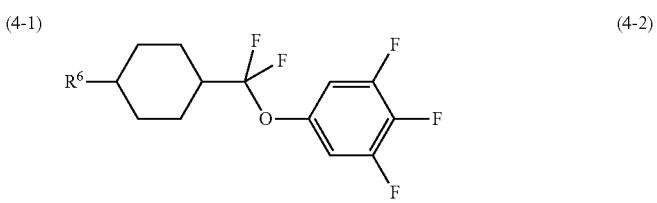

-continued
(4-3) 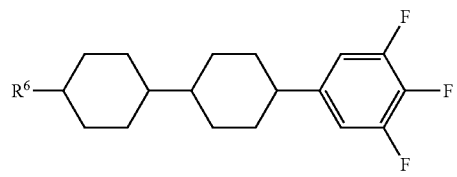
(4-4) 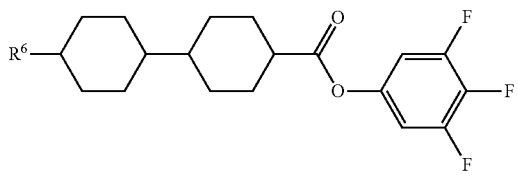
(4-5) 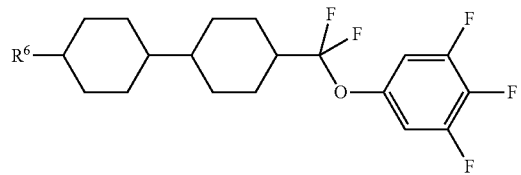
(4-6) 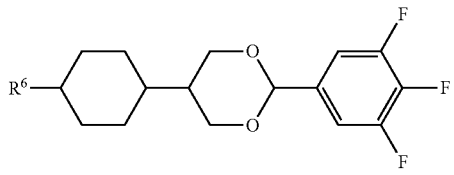
(4-7) 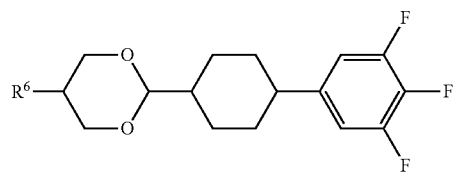
(4-8) 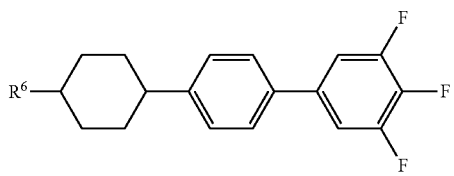
(4-9) 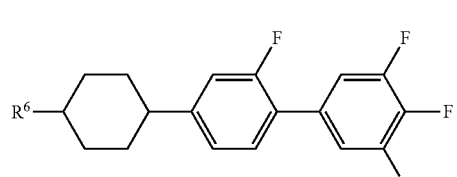
(4-10) 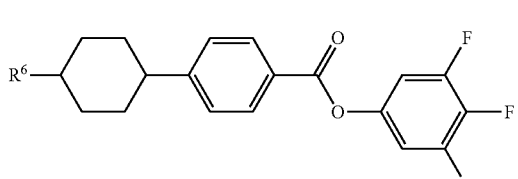
(4-11) 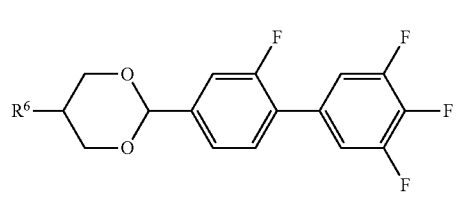
(4-12) 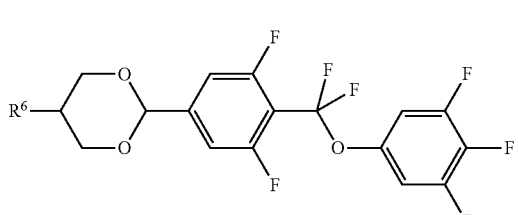
(4-13) 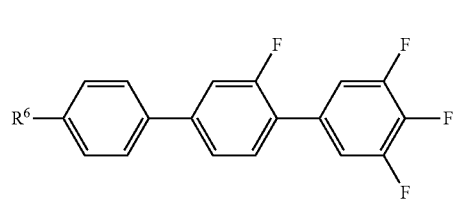
(4-14) 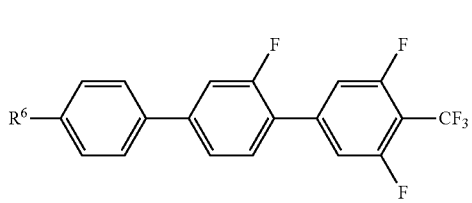
(4-15) 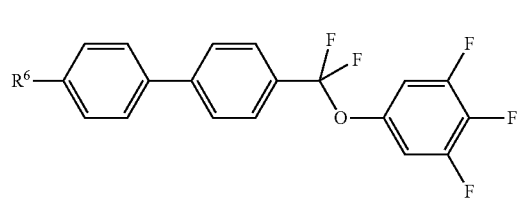
(4-16) 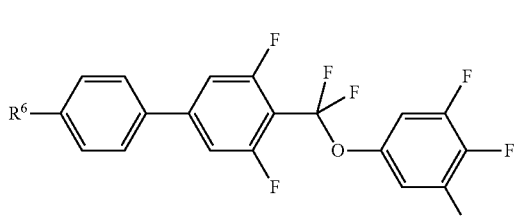
(4-17) 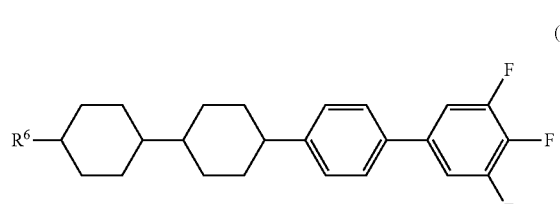
(4-18) 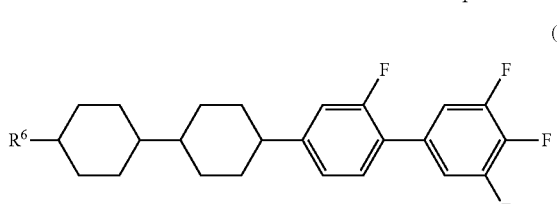

-continued (4-19) 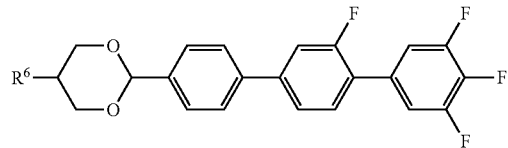

(4-20) 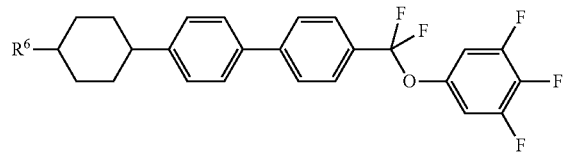

(4-21) 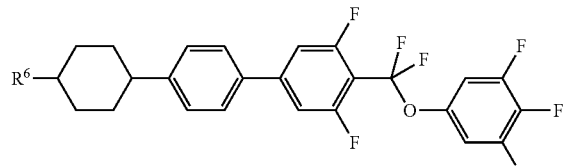

(4-22) 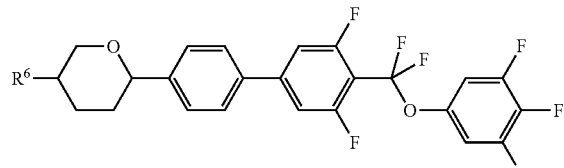

(4-23) 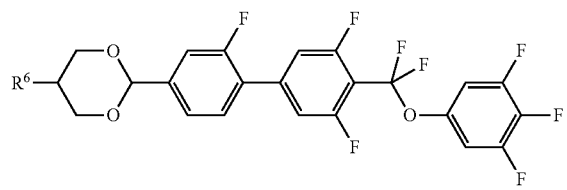

(4-24) 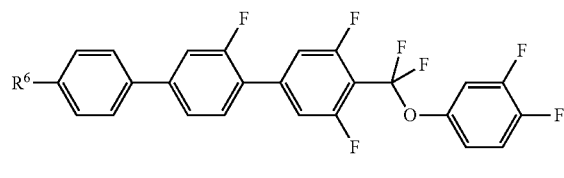

(4-25) 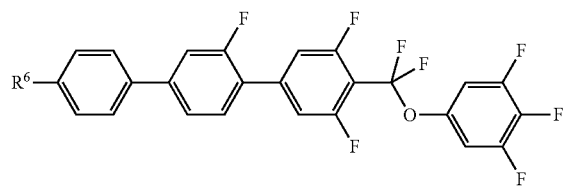

(4-26) 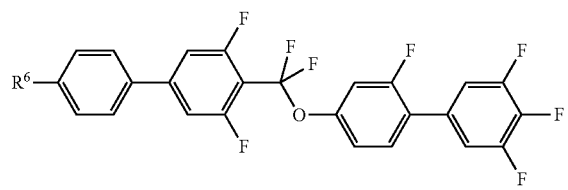

(4-27) 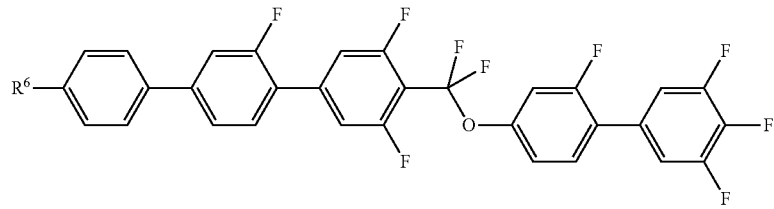

wherein, in formula (4-1) to formula (4-27), $R^6$ is alkyl having 1 to 12 carbons, alkoxy having 1 to 12 carbons or alkenyl having 2 to 12 carbons.

11. The liquid crystal composition according to claim 7, wherein, a ratio of the fourth component is in the range of 10% by weight to 60% by weight based on the weight of the liquid crystal composition.

12. The liquid crystal composition according to claim 8, wherein, a ratio of the fourth component is in the range of 10% by weight to 60% by weight based on the weight of the liquid crystal composition.

13. The liquid crystal composition according to claim 1, wherein a maximum temperature of a nematic phase is 70° C.

or higher, optical anisotropy (measured at 25° C.) at a wavelength of 589 nanometers is 0.07 or more, and dielectric anisotropy (measured at 25° C.) at a frequency of 1 kHz is 2 or more.

14. A liquid crystal display device comprising the liquid crystal composition according to claim 1.

15. The liquid crystal display device according to claim 14, wherein an operating mode in the liquid crystal display device is a TN mode, an ECB mode, an OCB mode, an IPS mode or a FPA mode, and a driving mode in the liquid crystal display device is an active matrix mode.

* * * * *